(12) United States Patent
Stojkovic et al.

(10) Patent No.: US 12,547,461 B2
(45) Date of Patent: Feb. 10, 2026

(54) SERVERLESS COMPUTING USING RESOURCE MULTIPLEXING

(71) Applicants: International Business Machines Corporation, Armonk, NY (US); University of Illinois at Urbana-Champaign, Urbana, IL (US)

(72) Inventors: Jovan Stojkovic, Champaign, IL (US); Hubertus Franke, Cortlandt Manor, NY (US); Tianyin Xu, Urbana, IL (US); Josep Torrellas, Champaign, IL (US)

(73) Assignees: International Business Machines Corporation, Armonk, NY (US); University of Illinois at Urbana-Champaign, Urbana, IL (US)

( * ) Notice: Subject to any disclaimer, the term of this patent is extended or adjusted under 35 U.S.C. 154(b) by 647 days.

(21) Appl. No.: 18/049,125

(22) Filed: Oct. 24, 2022

(65) Prior Publication Data
US 2024/0134698 A1 Apr. 25, 2024
US 2024/0231925 A9 Jul. 11, 2024

(51) Int. Cl.
*G06F 9/46* (2006.01)
*G06F 9/50* (2006.01)
*G06F 9/52* (2006.01)

(52) U.S. Cl.
CPC .............. *G06F 9/5033* (2013.01); *G06F 9/52* (2013.01)

(58) Field of Classification Search
CPC .................................. G06F 9/5033; G06F 9/52
See application file for complete search history.

(56) References Cited

U.S. PATENT DOCUMENTS

| | | | |
|---|---|---|---|
| 11,113,782 B2 | 9/2021 | Prakash et al. | |
| 11,301,562 B2 | 4/2022 | Tiwary et al. | |
| 11,375,042 B2 | 6/2022 | Sampath | |
| 2013/0167130 A1* | 6/2013 | Alvanos | G06F 8/4442 717/160 |
| 2018/0341502 A1* | 11/2018 | Rabasa | H04M 3/4217 |
| 2019/0377604 A1 | 12/2019 | Cybulski | |

(Continued)

FOREIGN PATENT DOCUMENTS

| | | |
|---|---|---|
| CN | 110832461 A | 2/2020 |
| WO | 2021139174 A1 | 7/2021 |

OTHER PUBLICATIONS

Ustiugov et al., "Benchmarking, Analysis, and Optimization of Serverless Function Snapshots," ASPLOS '21, Apr. 19-23, 2021, Virtual, USA, pp. 559-572.

(Continued)

*Primary Examiner* — Gregory A Kessler
(74) *Attorney, Agent, or Firm* — Yee & Associates, P.C.

(57) ABSTRACT

A computer implemented method manages function execution in a container. A dispatcher in the container running in a computer system executes a function initialization in response to a first request for a function. The dispatcher in the container running in the computer system creates group of handlers in response to receiving a group of requests for the function. The dispatcher in the container running in the computer system sends the group of requests to the group of handlers in response to receiving the group of requests. The dispatcher in the container running in the computer system executes the group of requests using the group of handlers.

25 Claims, 18 Drawing Sheets

(56) References Cited

U.S. PATENT DOCUMENTS

| | | |
|---|---|---|
| 2020/0226009 A1 | 7/2020 | Bachmutsky et al. |
| 2021/0263779 A1 | 8/2021 | Haghighat et al. |
| 2022/0004422 A1 | 1/2022 | Gero et al. |
| 2022/0156097 A1 | 5/2022 | Jain |
| 2023/0300086 A1* | 9/2023 | Ivanov .................. H04L 47/741 709/226 |

OTHER PUBLICATIONS

Du et al., "Catalyzer: Sub-millisecond Startup for Serverless Computing with Initialization-less Booting," ASPLOS '20, Mar. 16-20, 2020, Lausanne, Switzerland, pp. 467-481.

Kotni et al., "Faastlane: Accelerating Function-as-a-Service Workflows," 2021 USENIX Annual Technical Conference Jul. 14-16, 2021, pp. 957-971.

"Global Serverless Computing Market Outlook," Serverless Computing Market Size, Share, Analysis 2022-2027, EMR, available at: https://www.expertmarketresearch.com/reports/serverless-computing-market, last accessed on Oct. 24, 2022, 14 pages.

Roy et al., "IceBreaker: Warming Serverless Functions Better with Heterogeneity," ASPLOS '22, Feb. 28-Mar. 4, 2022, Lausanne, Switzerland, Feb. 2022, pp. 753-767.

Bhasi et al., "Kraken : Adaptive Container Provisioning for Deploying Dynamic DAGs in Serverless Platforms," SoCC '21, Nov. 1-4, 2021, Seattle, WA, USA, Nov. 2021, pp. 153-167.

Jia et al., "Nightcore: Efficient and Scalable Serverless Computing for Latency-Sensitive, Interactive Microservices," ASPLOS '21, Apr. 19-23, 2021, Virtual, USA, Apr. 2021, pp. 152-166.

Akkus et al., "SAND: Towards High-Performance Serverless Computing," 2018 USENIX Annual Technical Conference, Jul. 2018, pp. 923-935.

"Serverless Computing Market—Growth, Trends, Covid-19 Impact, and Forecasts (2022-2027)," Mordor Intelligence, available at https://www.mordorintelligence.com/industry-reports/serverless-computing-market#:~:text=Market%20Overview,environment%2C%20thereby%20augmenting%20the%20market, last accessed on Oct. 24, 2022, 8 pages.

Cadden et al., "SEUSS: Skip Redundant Paths to Make Serverless Fast," EuroSys '20, Apr. 27-30, 2020, Heraklion, Greece, pp. 1-15.

Dakes et al., "SOCK: Rapid Task Provisioning with Serverless-Optimized Containers," 2018 USENIX Annual Technical Conference, Jul. 11, 2018, pp. 57-69.

Ot, "The Serverless Computing Market in 2022," The Serverless Computing Market in 2022 | Enterprise Storage Forum, May 4, 2022, available at: https://www.enterprisestorageforum.com/cloud/serverless-computing-market/, last accessed on Oct. 24, 2022, 6 pages.

Daw et al., "Xanadu: Mitigating cascading cold starts in serverless function chain deployments," Middleware '20, Dec. 7-11, 2020, Delft, Netherlands, pp. 356-370.

* cited by examiner

SERVERLESS COMPUTING USING RESOURCE MULTIPLEXING

BACKGROUND

1. Field

The disclosure relates generally to an improved computer system and more specifically to a method, apparatus, computer system, and computer program product for serverless computing with resource multiplexing.

2. Description of the Related Art

Serverless computing is a cloud service where computing resources are transparently provided on demand to run applications. Service computing is also referred to as Function-as-a-Service (FaaS). With a serverless computing environment, the cloud service provider (CSP) handles and maintains the physical infrastructure and servers to support applications. Software developers using serverless computing can develop and execute code. The code can be for functions in applications. This code can be developed by software developers remotely without worrying about the server environment. In other words, software developers do not need to manage server computers. The servers are abstracted away from application development with a serverless computing environment. Users can use applications that are comprised of functions through cloud invocations with a serverless computing environment.

SUMMARY

According to one illustrative embodiment, a computer implemented method manages function execution in a container. A dispatcher in the container running in a computer system executes a function initialization in response to a first request for a function. The dispatcher in the container running in the computer system creates group of handlers in response to receiving a group of requests for the function. The dispatcher in the container running in the computer system sends the group of requests to the group of handlers in response to receiving the group of requests. The dispatcher in the container running in the computer system executes the group of requests using the group of handlers. According to other illustrative embodiments, a computer system and a computer program product for managing function execution in a container are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
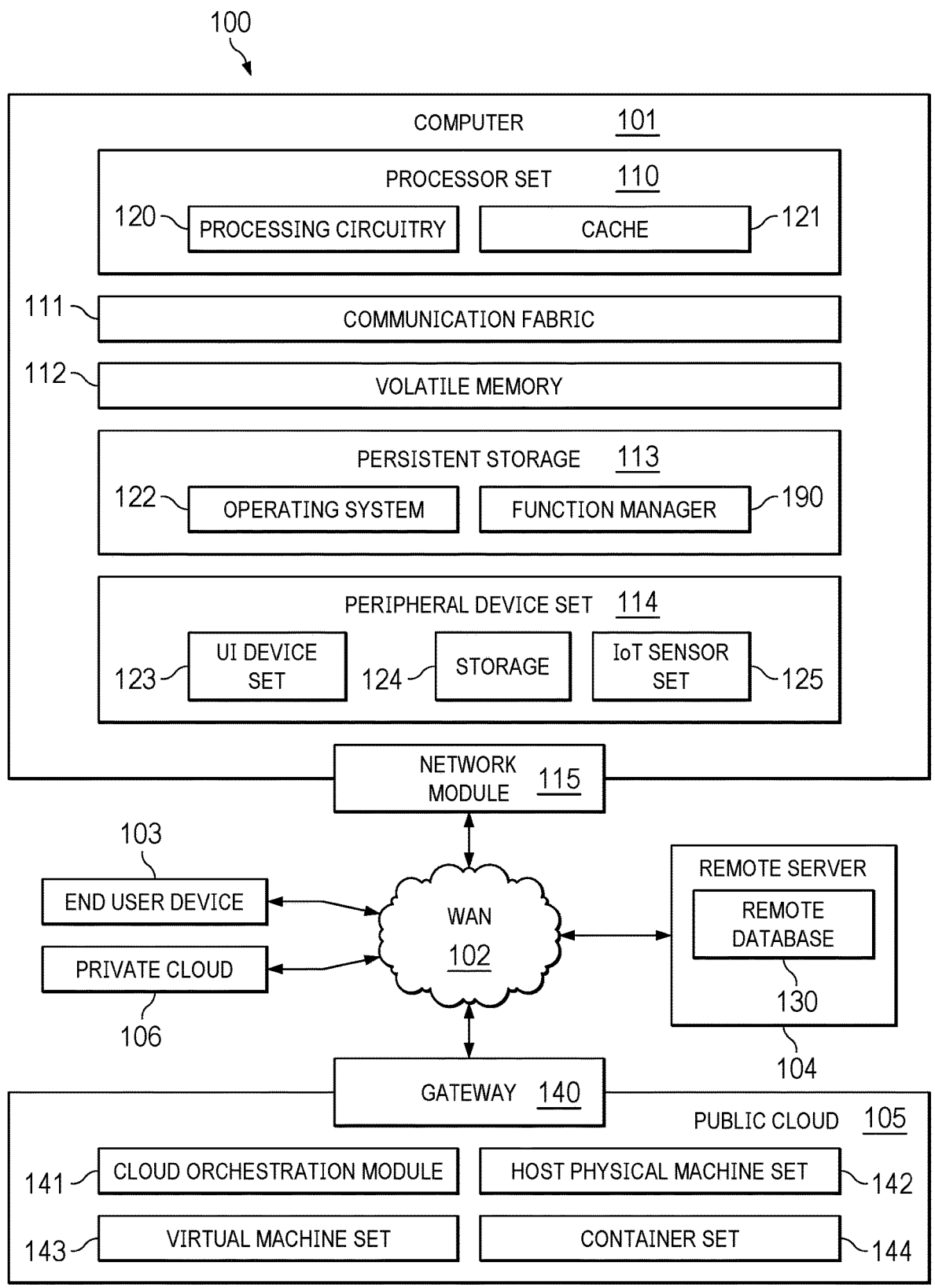
FIG. 1 is a block diagram of a computing environment in which illustrative embodiments can be implemented.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as function manager 190. In this example, function manager 190 can operate to initiate containers to implement function processing in a serverless computing environment. In the illustrative example, function manager 190 can operate to manage the execution of functions as part of serverless computing environment using resource multiplexing. In addition to function manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and function manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in function manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in function manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, the illustrative embodiments recognize and take into account that current serverless computing environments have significant inefficiencies. These inefficiencies can include low resource utilizations, long function response latencies, and other inefficiencies that reduce the overall efficiency of a serverless environment. Response time for function-based applications can increase with the accumulation of overheads along a chain of functions because of sequential dependencies for the functions.

One source of inefficiency in serverless computing includes the overheads associated with layers of virtualization, cold starts, RPC/HTTP invocations, and global storage accesses. Further, inefficiencies can occur through overhead accumulation from the execution of multiple functions. For example, in executing a function, the function execution requires container creation, runtime set up, platform overhead, and transfer function overhead. As result, two seconds of overhead can be present for 20 milliseconds of function execution.

Other sources of inefficiencies can occur from workload burstiness that occurs from large numbers of function requests recurring around the same time. For example, hundreds of thousands of concurrent requests having the same function can be made. With current execution systems, the execution of each request currently occurs in a separate container in a sequential manner. The maximum number of containers supported in memory can limit the number of functions that can be executed. Each invocation of the same function uses function code, libraries, share data, and other information. Much of this information is replicated and is not unique for different invocations of the same function. As a result, much of the memory used by function instance is replicated for each invocation of the function.

Additionally, inefficient function patterns can result in idle time that dominates function execution. Synchronous wait patterns can result in a function being idle for long periods of time in which the container is present in memory while the processor for that container is idle. This idle time can occur in response to a function invoking synchronous input/output and calling other functions.

The illustrative examples can improve the efficiencies in serverless environment through managing execution functions. For example, requests for a function can be executed in a container using a dispatcher and multiple handlers forked from said dispatcher. The dispatcher can perform initialization, forks, and scheduling of handlers in the container. The handlers can execute function code within the container such that multiple requests for the same function can be handled in one container.

As another example, smart handler scheduling can be included to manage concurrent functions processed by handlers. In one illustrative example, a container is assigned processing resources such as a number of cores. The scheduling of handlers can be performed such that the number of requests for the function do not exceed the number of cores assigned to the container. In one illustrative example, a dispatcher detects when a handler is blocked in response to making a blocking call and can assign the core for that handler making the blocking call to a waiting handler. That blocked handler is suspended in response to making the blocking call.

Additionally, remote data accesses can be coalesced to reduce resource usage. In one illustrative example, remote data accesses include, for example, remote storage accesses to storage located outside of the container.

Figure 2:
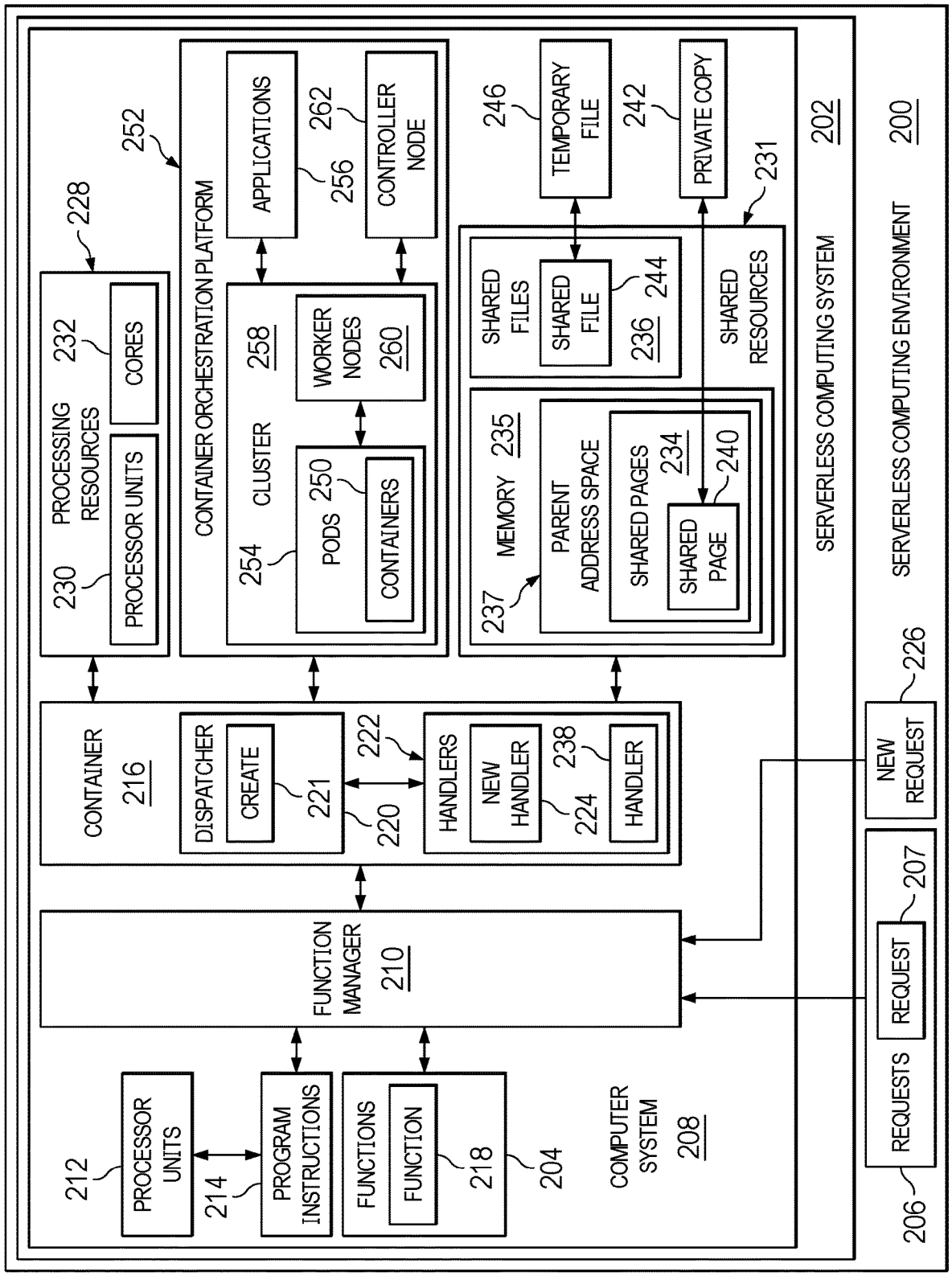
FIG. 2 is a block diagram of a serverless computing environment in which a dispatcher creates handlers in accordance with an illustrative embodiment.

With reference now to FIG. 2, a block diagram of a serverless computing environment in which a dispatcher creates handlers is depicted in accordance with an illustrative embodiment. In this illustrative example, serverless computing environment 200 includes components that can be implemented in hardware such as the hardware shown in computing environment 100 in FIG. 1.

In this example, serverless computing system 202 in serverless computing environment 200 can operate to manage the execution of functions 204 in response to receiving requests 206. This execution of functions 204 can be performed more efficiently by serverless computing system 202 as compared to currently available serverless computing systems. In this illustrative example, serverless computing system 202 comprises computer system 208 and function manager 210.

In this illustrative example, function manager 210 can perform a number of different operations for handling the execution of functions 204 in response to receiving requests 206. For example, function manager 210 can invoke container 216 with dispatcher 220 and a group of handlers 222 to perform function 218 in functions 204. In this illustrative example, each container is assigned to handle one function or functions 204. Further, function manager 210 can perform load-balancing between containers when one or more containers in addition to container 216 are created to execute requests 206 for functions 204.

Function manager 210, dispatcher 220, and the group of handlers 222 can be implemented in software, hardware, firmware or a combination thereof. When software is used, the operations performed by function manager 210, dispatcher 220, and the group of handlers 222 can be implemented in program instructions configured to run on hardware, such as a processor unit. When firmware is used, the operations performed by function manager 210, dispatcher 220, and the group of handlers 222 can be implemented in program instructions and data and stored in persistent memory to run on a processor unit. When hardware is employed, the hardware can include circuits that operate to perform the operations in function manager 210, dispatcher 220, and the group of handlers 222.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

As depicted, computer system 208 includes a number of processor units 212 that are capable of executing program instructions 214 implementing processes in the illustrative examples. In other words, program instructions 214 are computer readable program instructions.

As used herein, a processor unit in the number of processor units 212 is a hardware device and is comprised of hardware circuits such as those on an integrated circuit that respond and process instructions and program instructions that operate a computer. A processor unit can be implemented using processor set 110 in FIG. 1. When the number of processor units 212 execute program instructions 214 for a process, the number of processor units 212 can be one or more processor units that are on the same computer or on different computers. In other words, the process can be distributed between processor units 212 on the same or different computers in computer system 208. Further, the number of processor units 212 can be of the same type or different type of processor units. For example, the number of processor units 212 can be selected from at least one of a single core processor, a dual-core processor, a multi-processor core, a general-purpose central processing unit (CPU), a graphics processing unit (GPU), a digital signal processor (DSP), or some other type of processor unit.

In an illustrative example, function manager 210 manages function execution in container 216. In this example, function manager 210 manages the execution of function 218 in container 216 in response to request 207 for function 218. In other words, container 216 does not handle request 207 for other functions in functions 204 other than function 218 in this example.

As depicted, container 216 includes dispatcher 220. In this illustrative example, request 207 for function 218 can be sent by function manager 210 to dispatcher 220 in container 216. Dispatcher 220 can increase efficiency in processing requests 206 for function 218. In this example, dispatcher 220 performs create 221. Create 221 involves creating handlers 222 to process requests 206 for function 218.

In this example, create 221 in dispatcher 220 in container 216 executes function initialization in response to a first request for function 218. Dispatcher 220 creates a group of handlers 222 in response to receiving a group of requests 206 for function 218.

In this example, create 221 can create a handler in handlers 222 using a forked process. With this process, a handler can be created as a copy of another handler with the handler having its own address space. As used herein, a "group of" when used with reference items means one or more items. For example, a group of handlers is one or more handlers.

Dispatcher 220 executes the group of requests 206 using the group of handlers 222. In this depicted example, each handler in the group of handlers 222 handles a request in the group of requests 206 to execute function 218. The group of handlers 222 can execute the group of requests 206 using fork processes in the form of the group of handlers 222 in this example.

In the illustrative example, dispatcher 220 creates new handler 224 for the group of handlers 222 in response to receiving new request 226 for function 218, none of the group of handlers 222 being available to handle new request 226, and processing resources 228 being available to create new handler 224.

In these examples, a handler is created to execute a function and the handler terminates after executing the function. The handler handles one request before terminating in these examples.

As depicted, processing resources 228 can be assigned to the group of handlers 222 by dispatcher 220. The assignment of processing resources 228 can be, for example, one of a set of processor units 230 and a set of cores 232. In this example, a processor unit can include one or more cores. A core is hardware in a processor unit that can independently read and execute instructions for programs. A core can include, for example, a control unit, a logic unit with registers.

As used herein, a "set of" when used with reference items means one or more items. For example, a set of cores is one or more cores.

An additional feature in the illustrative example, involves shared resources 231 such as parent address space 237 in memory 235 in which at least one of group of shared pages 234 or a group of shared files 236 can be shared by the group of handlers 222 with the dispatcher parent process. In other words, all of the group of handlers 222 can read the group of shared pages 234 as long as no writes are made to any of shared pages 234 accessed by the group of handlers 222.

In this illustrative example, if handler 238 in the group of handlers 222 writes to shared page 240 in the group of shared pages 234, dispatcher 220 creates private copy 242 of shared page 240 for use by handler 238. In this example, future reads and writes by handler 238 are made to private copy 242 of shared page 240 instead of shared page 240. Other handlers in the group of handlers 222 can continue to make reads to shared page 240. This feature can be referred to as a copy on write (COW) and can be handled by the operating system.

In this illustrative example, the group of shared files 236 can be accessed by the group of handlers 222. While only reads are made to the group of shared files 236, the group of handlers can use the group of shared files 236. Once handler 238 needs to perform an update to shared file 244 in the group of shared files 236, dispatcher 220 creates temporary file 246 for use by handler 238 in place of shared file 244. Temporary file 246 is used by handler 238 for future reads and writes in place of shared file 244. Other handlers in the group of handlers 222 can continue to use shared files 236 including shared file 244 as long as only reads are made to those files.

In this example, private copy 242 and temporary file 246 are not part of shared resources 231. These data structures are used for writes made by handler 238. A similar creation of private copies and temporary files can be performed in response to write accesses being made to those shared resources by one or more of handlers 222. The use of shared resources 231 can reduce memory usage and time for function initialization in response to multiple requests for the same function.

In this illustrative example, container 216 can be a container in containers 250 in container orchestration platform 252. Container orchestration platform 252 is an example of an architecture that can be used to implement container 216. In this example, other containers in containers 250 can each include a dispatcher and handlers that process requests for a function. In other words, each container in containers 250 operates to process requests for a single function.

Container orchestration platform 252 can be, for example, a Kubernetes® architecture, environment, or the like. However, it should be understood that description of illustrative examples using Kubernetes is meant as an example architecture only and not as a limitation on illustrative embodiments. Container orchestration platform 252 can also be referred to as a container orchestration system.

Container orchestration platform 252 provides a platform for automating deployment, scaling, and operations of applications 256. In this illustrative example, cluster 258 runs in a Kubernetes® architecture, environment, or the like. However, it should be understood that description of illustrative examples using Kubernetes is meant as an example architecture only and not as a limitation on illustrative embodiments.

Container orchestration platform 252 provides a platform for automating deployment, scaling, and operations of applications 256. Container orchestration platform 252 also provides automatic deployment, scaling, and operations of pods 254. Each pod in pods 254 comprises a number of containers 250 running application workloads for applications 256 across cluster 258 of worker nodes 260.

These worker nodes 260 are also referred to as host nodes or minions. While the term "pod" is generally used in the Kubernetes paradigm, the term as used herein is not limited to that environment but rather refers to any grouping of a number of containers 250 where workloads are deployed and hold the running applications, libraries, and their dependencies.

A container is a standard unit of software for an application that packages up program instructions and all its dependencies, so the application can run on multiple computing environments. A container isolates software from the environment in which the container runs and ensures that the container works uniformly in different environments. A container for an application can share the operating system kernel on a machine with other containers for other applications. As a result, an operating system is not required for each container running on the machine.

Controller node 262 corresponds to cluster of worker nodes 260 that performs customer application workloads. Controller node 262 receives and tracks service requests from client device users requesting performance of services corresponding to applications 256. Controller node 262, which is a main controlling unit of cluster 258 of worker nodes 260, manages a customer application for cluster 258 and directs communication across worker nodes 260 in cluster 258. A worker node in worker nodes 260 is a machine, either physical or virtual, where containers for applications are deployed. While the terms "controller node" and "worker node" are generally used in the Kubernetes paradigm, these terms as used herein are not limited to that environment but rather refer to any type of nodes that are capable of controlling and running applications 256.

In this illustrative example, controller node 262 can decide what processing resources 228 are assigned to containers 250. For example, controller node 262 can decide the number of cores 232 assigned to each of containers 250. This assignment information is forwarded to dispatcher 220 assigned to its container.

Figure 3:
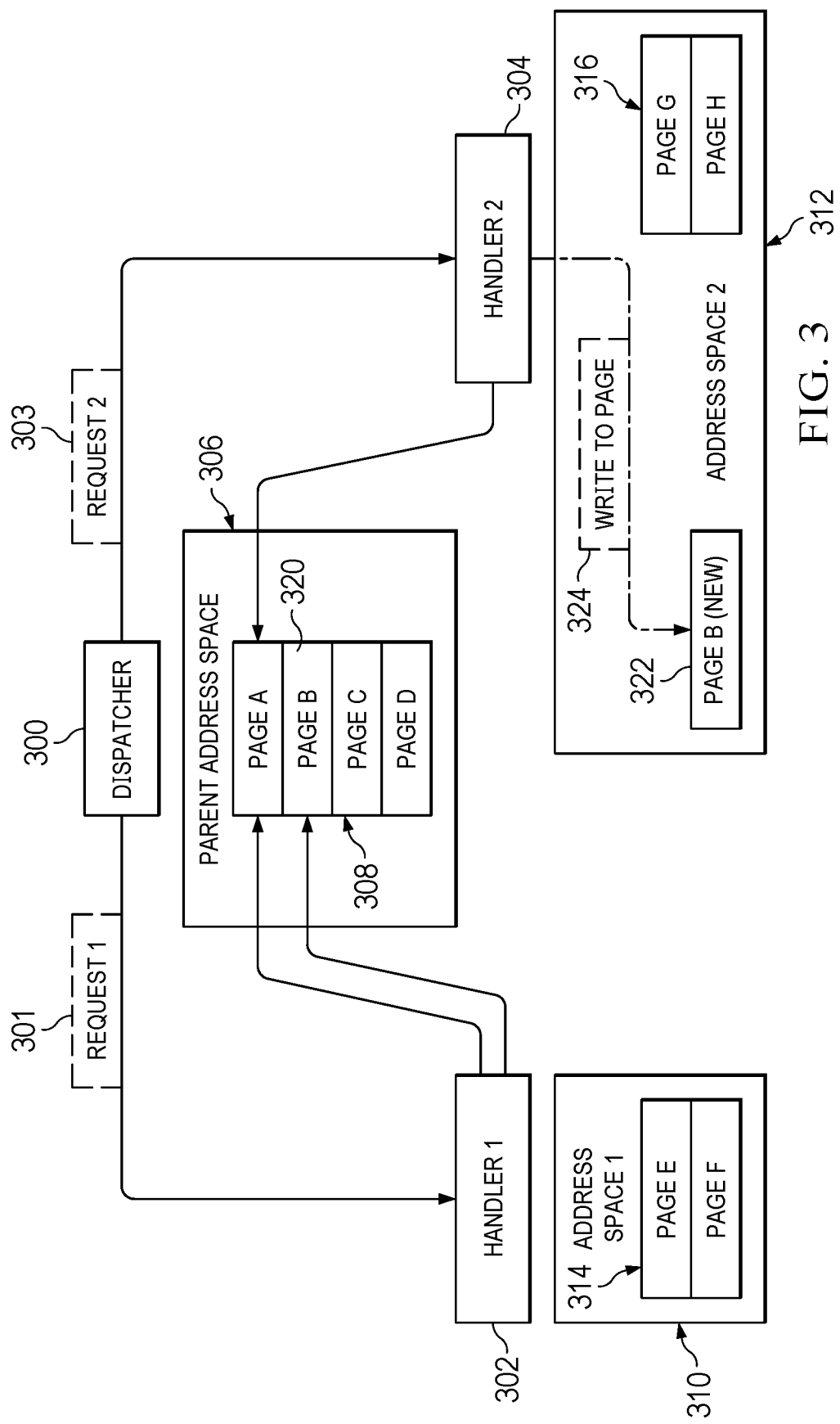
FIG. 3 is a diagram of handlers using a shared memory address to execute a function in accordance with an illustrative embodiment.

With reference next to FIG. 3, a diagram of handlers using a shared memory address to execute a function is depicted in accordance with an illustrative embodiment. In this illustrative example, dispatcher 300 is an example of dispatcher 220 in FIG. 2. As depicted, handler 1 302 and handler 2 304 are examples of handlers 222 in FIG. 2.

In this illustrative example, dispatcher 300 performs initialization of a function, forks handlers, and schedules handlers to execute functions. Handler 1 302 and handler 2 304 execute function code in parallel. For example, handler 1 302 can execute a function in response to receiving request 1 301 from dispatcher 300 to execute the function. Handler 2 304 can execute the same function in parallel to handler 1 302 in response to receiving request 2 303 for the same function.

In this example, these handlers can access parent address space 306 in executing the functions. As depicted, parent address space 306 is a resource in shared resources 231 in FIG. 2. As depicted, parent address space 306 is a location in memory where pages 308 are stored for shared use by dispatcher 300, handler 1 302 and handler 2 304 in this example. These handlers have access to the portions of parent address space 306 that they do not overwrite. This access to the portions of parent address space 306 can be provided through a logical copy of parent address space 306 being inherited when the handlers are forked. Additionally, handler 1 302 also has access to address space 1 310 and handler 2 304 has access to address space 2 312 to execute a function.

Handler 1 302 can access pages 314 in address space 1 310 that are separate from pages 308 from parent address space 306. This address space is accessible only by handler 1 302 in this example. In a similar fashion, handler 2 304 can access pages 316 in address space 2 312 that are only accessible by handler 2 304 in this example.

In this illustrative example, the access to parent address space 306 is for reading pages 308. In response a write to one of pages 308, a private copy of the page is made in an address space for the particular handler. For example, when handler 2 304 writes page B 320 in pages 308, copy 322 of page B 320 is created in address space 2 312. As a result, handler 2 304 performs write to page 324 to copy 322. Additionally, further reads to this page are also made to copy 322 rather than page B 320.

With the use of parent address space 306 as a shared resource for handlers, an increase in memory utilization can occur. Parent address space 306 can be used by the handlers to share pages that are common or overlap between the handlers. For example, with a 95% overlap, a 10 times memory utilization improvement can be achieved. As result, a higher density of active handlers executing functions can be achieved resulting in better concurrency in executing requests for the same function.

Figure 4:
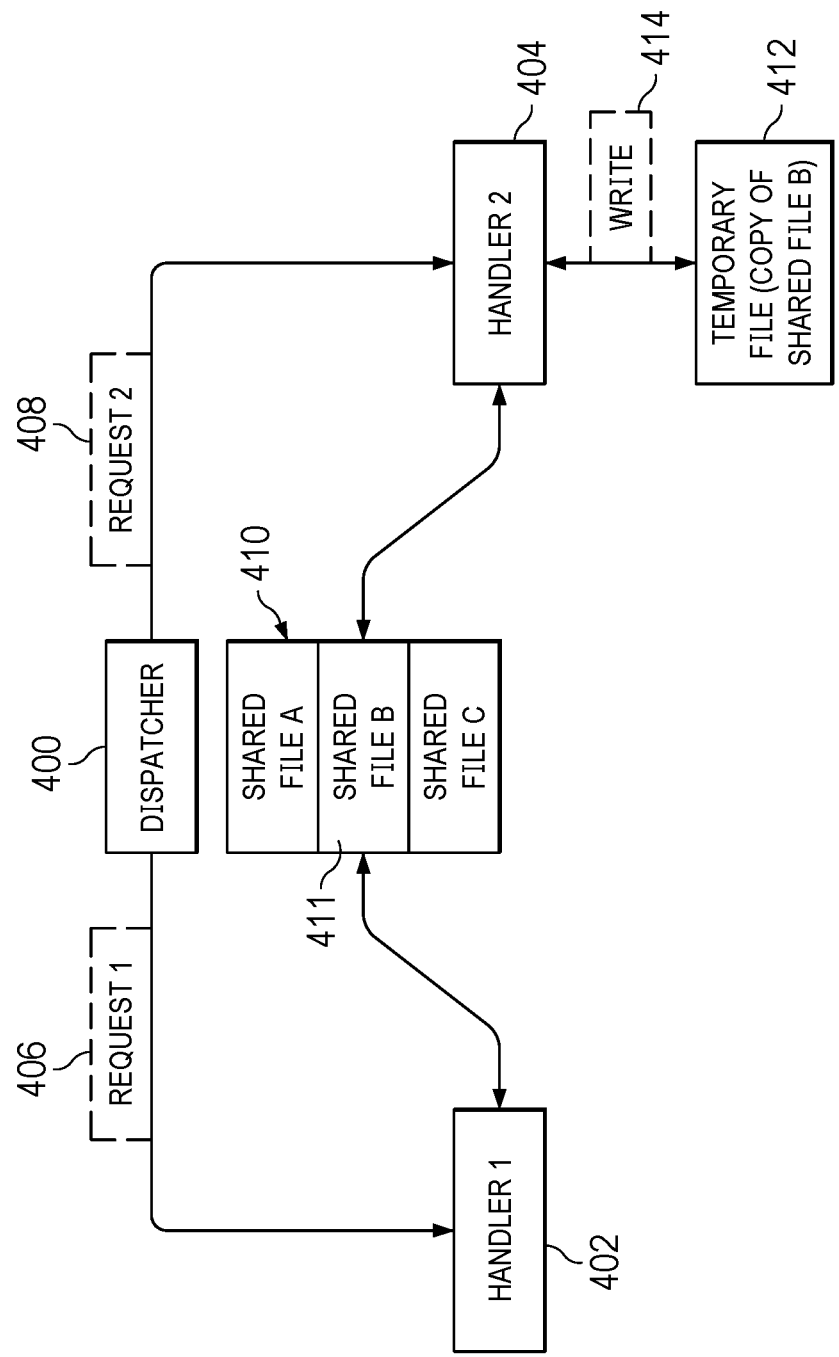
FIG. 4 is a diagram illustrating handlers using shared files to execute a function in accordance with an illustrative embodiment.

With reference next to FIG. 4, a diagram illustrating handlers using shared files to execute a function is depicted in accordance with an illustrative embodiment. In this illustrative example, dispatcher 400 is an example of dispatcher 220 in FIG. 2. Handler 1 402 and handler 2 404 are examples of handlers 222 in FIG. 2. Handler 1 402 and handler 2 404 execute the same function in parallel. For example, handler 1 402 can execute a function in response to receiving request 1 406 from dispatcher 400 to execute the function. Handler 2 304 can execute the same function in parallel to handler 1 302 in response receiving request 2 408.

In this illustrative example, both handler 1 402 and handler 2 404 access shared files 410 to execute the same function concurrently. In this example, each handler does not need a separate copy of shared files 410 while read accesses are made. However, if one of the handlers needs to update the file with a write and performs the write, the shared file for the update is no longer shared between these two handlers. Instead, a copy of the shared file is made for use by the handler performing the write operation.

For example, if handler 2 404 needs to perform a write to shared file B 411 in shared files 410, temporary file 412 is created as a copy of shared file 410. In this example, handler 2 404 performs write 414 to temporary file 412 instead of shared file B 411. As a result, handler 2 404 performs future reads and writes to temporary file 412 and no longer uses shared file B 411. Shared file B 411 can be continued to be used by handler 1 402 and any other handlers making read accesses to shared file 410.

Additionally, handler 2 404 can continue to use the other shared files in shared file 410 for read accesses. In this example, temporary file 412 is discarded after execution of the function is completed by handler 2 404.

This feature provides improvements in memory utilization through reducing the number of copies of files that are needed to execute functions. In this example, the management of shared files 410 are performed by dispatcher 400.

Figure 5:
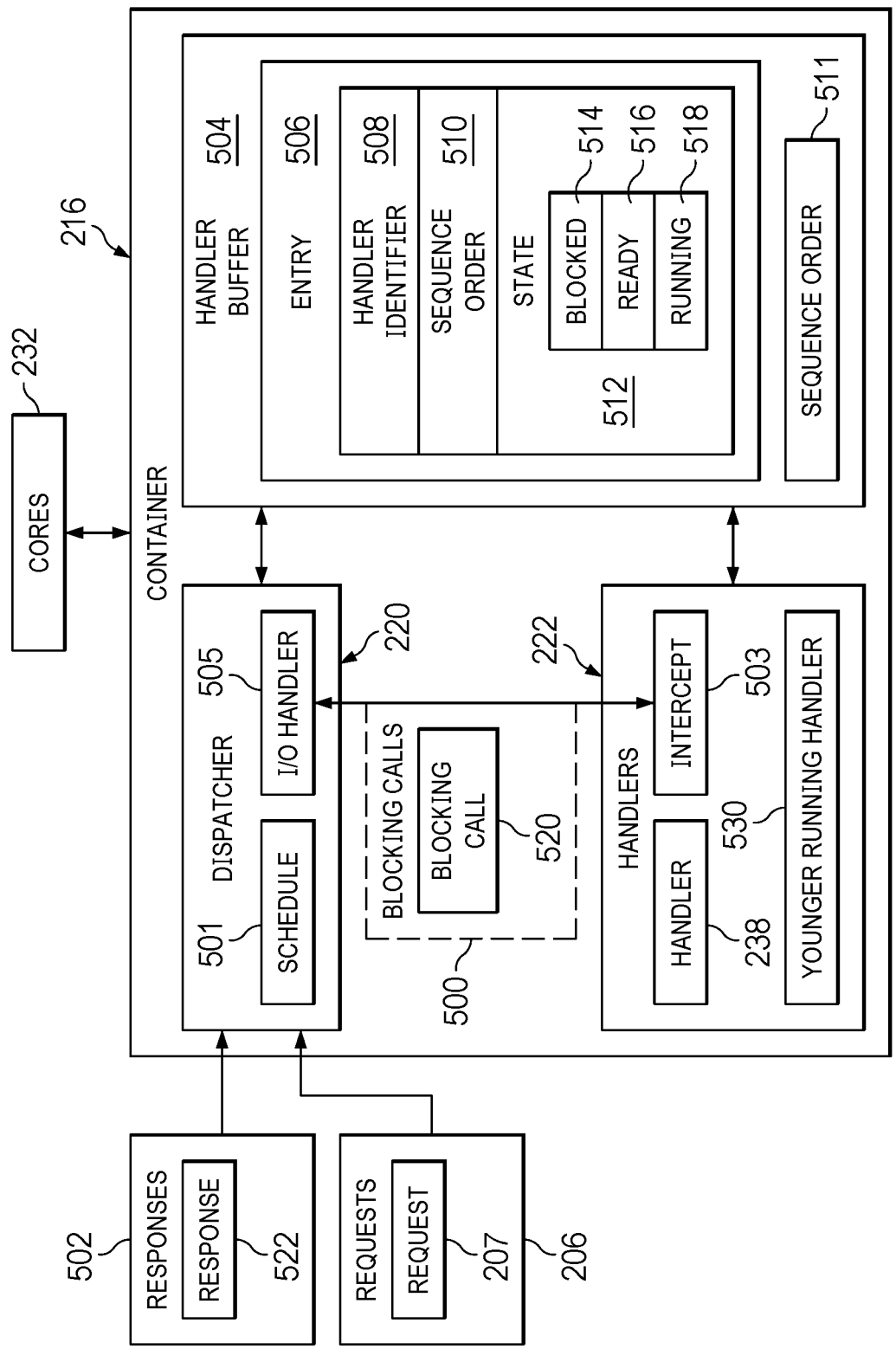
FIG. 5 is a block diagram depicting handler scheduling in accordance with an illustrative embodiment.

With reference next to FIG. 5, a block diagram depicting handler scheduling is depicted in accordance with an illustrative embodiment. In the illustrative examples, the same reference numeral may be used in more than one figure. This reuse of a reference numeral in different figures represents the same element in the different figures.

In this illustrative example, dispatcher 220 includes schedule 501, which is a component in dispatcher 220 that manages scheduling of the group of handlers 222 in processing the group of requests 206 for function 218. In this example, the group of requests 206 are received by dispatcher 220 from a request handling component such as function manager 210 in FIG. 2. This scheduling by schedule 501 in dispatcher 220 can be based on the availability of processing resources 228, such as the number of cores 232 or the number of processor units 230, to execute function 218.

In this illustrative example, handlers 222 include an intercept component, such intercept 503. For example, handler 238 can include intercept 503, which is a library function in a library for handlers 222 that can be used to intercept calls made by handlers 222. The calls can be blocking calls 500 made by handlers 222 and with blocking calls 500 intercepted by intercept 503 and being directed to input/output (I/O) handler 505 in dispatcher 220.

In this illustrative example, a function library for the handler can be used to intercept a remote blocking call made by a handler and forward that call to dispatcher 220. Blocking calls 500 can be forwarded to dispatcher 220 to I/O handler 505. In this example, I/O handler 505 in dispatcher 220 receives blocking calls 500 and handles the I/O for the blocking call and interactions with schedule 501 in dispatcher 220.

In this example, blocking call 520 is made using intercept 503. Intercept 503 can include a library function in the library that sends a blocking call made by a handler to I/O handler 505 in dispatcher 220 that interacts with schedule 501. This process in intercept 503 can be transparent to the application or function which dynamically links with this library. This library can be a version of a normal use library that includes modifications to redirect blocking calls 500 from handlers 222 to I/O handler 505 in dispatcher 220.

In this illustrative example, blocking calls 500 made by the group of handlers 222 are intercepted and sent I/O handler 505 to dispatcher 220, which handles making the blocking call and interacting with schedule 501 to handle scheduling of handlers 222. A blocking call can be for example, an input/output call to access a remote storage, a remote procedure call (RPC) or some other type of remote access.

Dispatcher 220 can perform various operations in response to I/O handler 505 receiving blocking calls 500. For example, in response to handler 238 making blocking call 520, blocking call is directed by I/O handler 505 in dispatcher 220. I/O handler 505 interacts with schedule 501, which suspends handler 238 in response to I/O handler receiving blocking call 520. The suspending of handler 238 by dispatcher 220 using schedule 501 makes processing resources such as any of cores 232 used by handler 238 available for use by other handlers. I/O handler 505 makes blocking call 520.

In response to I/O handler 505 in dispatcher 220 receiving results, I/O handler 505 can return the results in responses 502 to handlers 222 making blocking calls 500. Further in response to I/O handler 505 receiving responses 502, schedule 501 in dispatcher 220 can schedule when handlers 222 will no longer be suspended and can run to execute the function 218.

For example, in response to receiving response 522 returned from block call 520 made by handler 328, the suspension of handler 238 can continue if all of cores 232 assigned to container 216 are busy executing another request for function 218. In other words, the suspension of handler 238 continues while cores 232 may be in use by other handlers currently executing requests 206 for function 218.

In this illustrative example, the management of handlers 222 is performed using handler buffer 504. Handler buffer 504 is a data structure containing information about a pool of handlers such as the group of handlers 222.

Schedule 501 in dispatcher 220 can record information about group of handlers 222 in handler buffer 504. An entry can be generated in handler buffer 504 for each handler in in the group of handlers 222 in handler buffer 504. For example, entry 506 for handler 238 can comprise handler identifier 508, sequence order 510, and state 512.

Handler identifier 508 can be any unique identifier for a handler in the group of handlers 222. Schedule 501 in dispatcher 220 can record sequence order 511 for each of the group of handlers 222 based on when handlers in the group of handlers 222 are created. In this example, the sequence order 510 indicates when handler 238 was created relative to other handlers in the group of handlers 222. Sequence order 510 can be used to determine whether handler 238 is newer or older than another handler in the group of handlers 222.

State 512 indicates the current state of a handler. State 512 can be, for example, blocked 514, ready 516, and running 518.

In this example, blocked 514 is a state in which handler 238 is waiting for response 522 to blocking call 520 to be returned. Ready 516 means that response 522 to the blocking call 520 have been returned but handler 238 has not been released or scheduled to run. Running 518 is a state in which handler 238 is running to execute a request for function 218.

In this illustrative example, I/O handler 505 in dispatcher 220 receives a forwarded blocking, such as blocking call 520, that is intercepted by intercept 503 in handler 238. In receiving and handling blocking calls 500, schedule 501 in dispatcher 220 can track handler 238 making blocking call 520. Dispatcher 220 upon issuing the forwarding blocking call and receiving the results in response 522 from remote service storage using I/O handler 505, can pass a value received in response 522 to handler 238 making blocking call 520. Response 522 received by I/O handler 505 is passed to intercept 503 and schedule 501 releases handler 238 for continuing execution of the request. In addition, dispatcher 220 can utilize I/O handler 505 and schedule 501 to hold forwarding response 522 to handler 238 until cores are available.

In this illustrative example, dispatcher 220, using schedule 501, can determine to suspend handler 238 in the group of handlers 222 or resume handler 238 in the group of handlers based on the sequence order 511 for the group of handlers 222. Schedule 501 can schedule the running of the group of handlers 222 based on availability of processing resources 228 such as, for example, cores 232.

In this illustrative example, handler 238 can be marked as blocked 514 by dispatcher 220 in response to handler 238 making blocking call 520 in blocking calls 500. Further, dispatcher 220 suspends handler 238. In other words, handler 238 is no longer running and any cores assigned to handler 238 can be used by other handlers. In this example, handler 238 does not need the core or cores because handler 238 is idle, waiting for response 522 to blocking call 520.

In one illustrative example, schedule 501 in dispatcher 220 can resume handler 238 in response to a number of a set of cores 232 being available for handler 238. In this example, schedule 501 can keep handler 238 suspended and marked as ready 516 in response to a number of a set of cores 232 being unavailable.

In one illustrative example, schedule 501 in dispatcher 220 suspends handler 238, tracks state 512 of handler 238, and marks handler 238 as ready 516 in response to a number of the set of cores 232 for container 216 being unavailable for handler 238. In this example, schedule 501 can resume handler 238 based on sequence order 510 of handler in response to the number of the set of cores 232 becoming available for handler 238.

In other words, based on how old or how new handler 238 is relative to other handlers in the group of handlers 222, handler 238 can be resumed and assigned one or more of the number of the set of cores 232 available for use. In this illustrative example, a priority can be given to handlers 222 that are older than other handlers.

In another illustrative example, schedule 501 in dispatcher 220 can resume handler 238 in response to younger running handler 530 being present and running in the group of handlers 222. In this case, dispatcher 220, using schedule 501, can suspend younger running handler 530. Any of cores 232 assigned for use by younger running handler 530 can be assigned to handler 238.

In this depicted example, handler 238 is suspended when handler 238 makes blocking call 520 and state 512 is marked as blocked 514. In other words, handler 238 is no longer running. When handler 238 is suspended, the number of cores 232 assigned to handler 238 can be reassigned for use by other handlers. Once the response 522 to blocking call 520 is returned, handler 238 is marked as ready 516. Handler 238 remains suspended and does not complete executing the request until scheduled to run by dispatcher 220 based on the availability of cores 232.

As a result, dispatcher 220 can use I/O handler 505 and schedule 501 to perform handler scheduling based on processing resources 228 that are available, such as the number of processor units 230 or the number of cores 232 assigned to container 216. The scheduling of handlers 222 can be performed such that the number of handlers 222 that are running and executing requests 206 for function 218 is not greater than the number of cores 232. As a result, when handlers 222 become blocked from making blocking calls 500, those handlers are suspended by dispatcher 220 and cores 232 used by the suspended handlers remain available for other handlers that are currently suspended and are ready to run or to create new handlers. Thus, a more efficient use of processing resources can be made through scheduling performed by dispatcher 220. With this scheduling by dispatcher 220, bottlenecks with respect to processing resources can be reduced or removed. In other words, processing resources such as cores 232 are matched up to handlers 222 in the illustrative examples.

Figure 6:
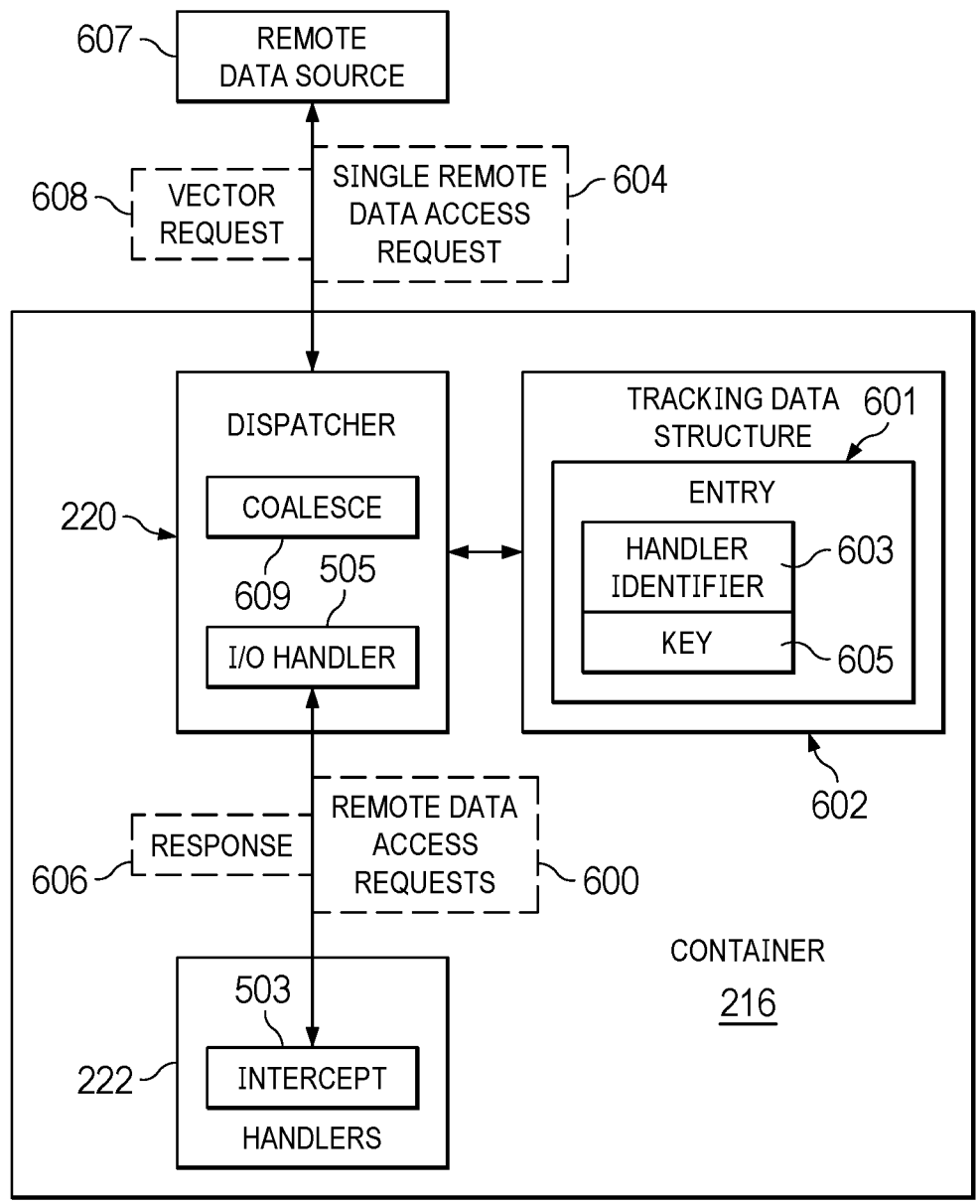
FIG. 6 is a diagram illustrating coalescing remote data access by handlers in accordance with an illustrative embodiment.

With reference next to FIG. 6, a diagram illustrating coalescing remote data access by handlers is depicted in accordance with an illustrative embodiment. In this illustrative example, coalesce 609 is a component in dispatcher 220. Coalesce 609 can coalesce remote data accesses made by the group of handlers 222.

For example, dispatcher 220 can record remote data access requests 600 for the same data from handlers 222 in the group of handlers 222. Information about remote data access requests 600 for remote data access can be recorded by dispatcher 220 in tracking data structure 602.

In this depicted example, handlers 222 use intercept 503 to make calls such as remote data access requests 600. These requests are directed to I/O handler 505 in dispatcher 220. As depicted, I/O handler 505 receives remote data access requests 600 from intercept 503 for handlers 222 as a redirect of the request for data access normally made by handlers 222 from remote data source 607.

For example, intercept 503 can include a library with modifications to remote data access requests 600 from handlers that redirect those requests to I/O handler 505 in dispatcher 220. As a result, remote data access requests 600 made by handlers 222 intercept 503 directs those requests to I/O handler 505 which interacts with coalesce 609 instead of being sent to remote data source 607.

In this example, remote data access requests 600 are mode using I/O handler 505 which interacts with coalesce 609. Coalesce 609 determines whether remote requests access requests 600 can be coalesced.

In this illustrative example, tracking data structure 602 can be a table, a database, or other data structure that can store information about the status and holding of data from remote data access requests 600. Tracking data structure 602 tracks remote data access requests 600 that have been made but responses have not been returned to the handlers generating those remote data access requests.

As depicted in this example, tracking data structure 602 includes entries to track remote data access requests 600 and determine whether those accesses are for the same data. For example, entry 601 in tracking data structure 602 comprises handler identifier 603 and key 605.

In this example, handler identifier 603 identifies a handler in handlers 222 making a remote data access request. In this depicted example, key 605 provides information that identifies the remote data access request made by the handler. For example, if the request is to obtain a temperature for Austin Texas, the key can be Austin TX, temperature. Key 605 can also contain an address or other identifier for the remote data source.

Dispatcher 220, using I/O handler 505 and coalesce 609, can make single remote data access request 604 for the same data and receive response 606. This single request is made in place of multiple requests that would be made by handlers 222 without the use of coalesce 609 in dispatcher 220 in this example. Coalesce 609 in dispatcher 220 can wait for a period of time or for a number of remote data access requests 600 for the same data to be made before using I/O handler 505 to issue single remote data access request 604 for that same data.

In this example, before making a remote data access request, coalesce 609 in dispatcher 220 can determine whether additional remote data access requests are present in tracking data structure 602 for the same data. This determination can be made by determining whether the key for the remote data access request matches keys for other previously made remote data access requests in tracking data structure 602. In another example, each time a remote data access request is made, the key for that remote data access request can be compared to keys for other remote data access requests to determine how many requests have been made for that same data.

As depicted, single remote data access request 604 is made to remote data source 607. Remote data source 607 can be, a remote storage, a remote service, or some other remote source of data. As depicted, dispatcher 220 using I/O handler 505 and coalesce 609, returns response 606 to the single remote data access request 604 to handlers in the group of handlers 222 making remote data access requests 600 for the same data. In this example, the other handlers can be identified based on searching for matching keys in tracking data structure 602.

In another example, coalesce 609 in dispatcher 220 can coalesce remote data access requests 600 to the same data source. In this example, the remote data access requests 600 may be for different data but from the same data source, such as remote data source 607. For example, dispatcher 220 can use coalesce 609 can cause I/O handler 505 to combine remote data access requests 600 to access data in a same data source into vector request 608. In this example, vector request 608 is a request for multiple parameters. For example, two handlers can request data from remote data source 607. For example, one handler can request temperature from a data source such as a weather service while another handler requests humidity from the same weather service.

In this example, a single request can be made by coalesce 609 interacting with I/O handler 505 in which the single request requests both of these parameters. This single request with the two parameters is vector request 608. In this manner only a single request, such as vector request 608, needs to be made by dispatcher 220 using coalesce 609 interacting with I/O handler 505 even though multiple requests are received from handlers 222.

In another illustrative example, dispatcher 220 can also use coalesce 609 and I/O handler 505 to coalesce functions. For example, dispatcher 220 can delay a remote procedure call (RPC) for a predetermined amount, for instance 5 milliseconds. If other remote procedure calls to the same function are detected in the meantime (with or without the same argument values), dispatcher 220 can coalesce all of these remote procedure calls into a single I/O transaction that requires executing all the function instances at the destination node. In the illustrative example, pure functions are deterministic functions that do not have any side effects. For pure functions, dispatcher 220 maintains a table that records the set of {input values, output values} tuples observed in the past. In this example, the table can be located in tracking data structure 602. When dispatcher 220 is about to call a pure function with certain input values, dispatcher 220 checks the table. If dispatcher 220 finds an entry with the same inputs, dispatcher 220 reads the outputs and skips the remote procedure call.

Figure 7:
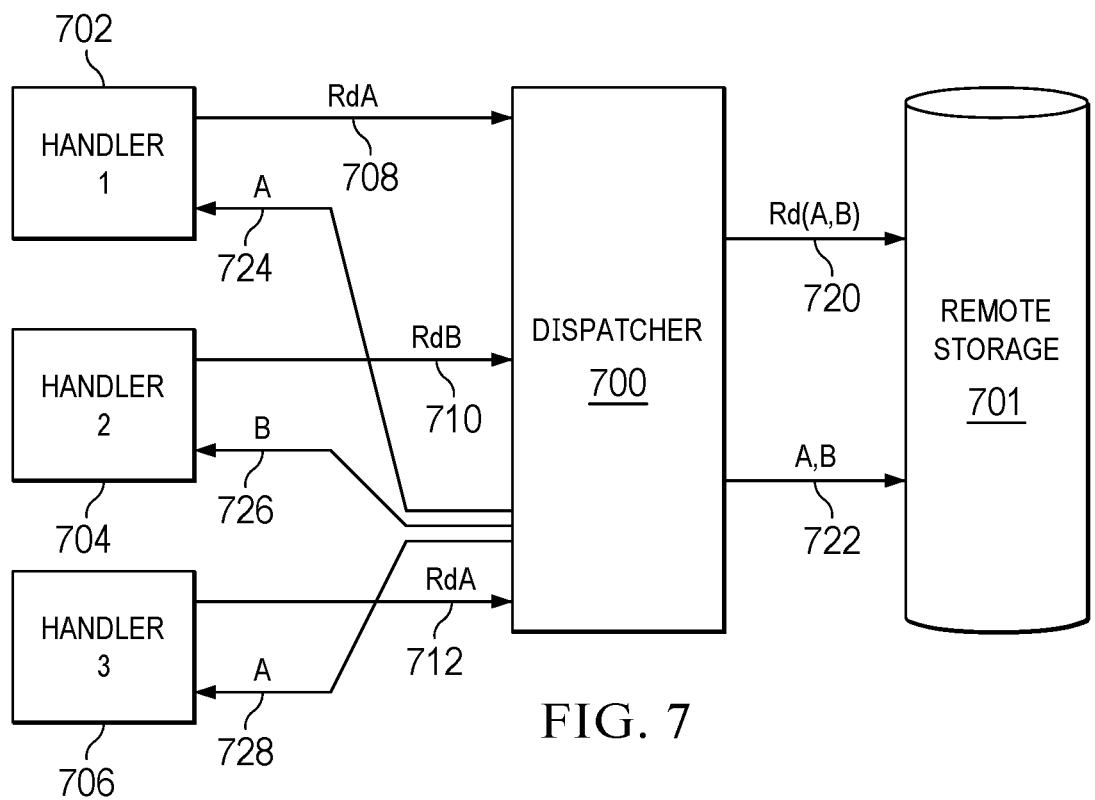
FIG. 7 is a diagram illustrating coalescing remote storage accesses in accordance with an illustrative embodiment.

With reference now to FIG. 7, a diagram illustrating coalescing remote storage accesses is depicted in accordance with an illustrative embodiment. In this illustrative example, dispatcher 700 is an example of an implementation for dispatcher 220 for as depicted, dispatcher 700 receives request for remote data access to access data in remote storage 701 from handler 1 702, handler 2 704, and handler 3 706.

As depicted, handler 1 702 makes remote access request RdA 708, handler 2 704 makes remote access request RdB 710, and handler 3 706 makes remote access request RdA 712. In this example, the requests are not made at the same time.

As depicted, dispatcher 700 receives the data access requests from the handlers in the following order RdA 708, RdB 710, and RdA 712. In this example, handler 1 702 and handler 3 706 request the same data from remote storage 701. Handler 2 704 requests different data but from the same data source, remote storage 701.

As depicted in this example, dispatcher 700 makes a single request based on the requests received from these handlers. In this illustrative example, only a single request is made for RdA. Further, a single request can be made even though handler 2 704 requests different data RdB. In this case, dispatcher 700 makes vector request Rd(A,B) 720. This vector request is a single request that requests data for both RdA and RdB.

In response, dispatcher 700 receives response A, B 722 from remote storage 701. In this example, dispatcher 700 returns response A 724 to handler 1 702, response B 726 to handler 2 704, and response A 728 to handler 3 706. Thus, dispatcher 700 can make a single request in response to receiving multiple remote data access requests from handlers. This type of coalescing of requests can reduce the number requests that remote data sources such as remote storage 701 process. Further, reduced use of network resources from coalescing requests can improve network bandwidth that is available through this handling of remote data access request by dispatcher 700.

In one illustrative example, one or more solutions are present that overcome a problem with the performance executing functions in serverless computing environments. As a result, one or more technical solutions may provide an ability to use a dispatcher and handlers to execute the same function multiple times in a container. In the illustrative example, the dispatcher can fork a handler for each request to execute the function. A number of handlers created can be based on processing resources assigned to the container such as cores. Additionally, the dispatcher can schedule the running of handlers based on the availability of processing resources. The scheduling can take into account the occurrence of blocking calls which result in handlers being idle during the blocking call. Further, the dispatcher can coalesce remote data access request to reduce the load on remote data sources and increase bandwidth availability.

The illustration of the components for handing the execution of functions using dispatchers and handlers in FIGS. 1-7 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, create 221 in dispatcher 220 can be used independently of schedule 501, intercept 503, and coalesce 609. For example, create 221 can be used in dispatcher 220 without using the other components. In other illustrative examples, dispatcher 220 can include create 221, schedule 501, intercept 503. In other illustrative examples, create 221 can be used with coalesce 609. In yet other illustrative examples, all three of these components can be used in dispatcher 220 to manage the execution of multiple requests for function by handlers.

Figure 8:
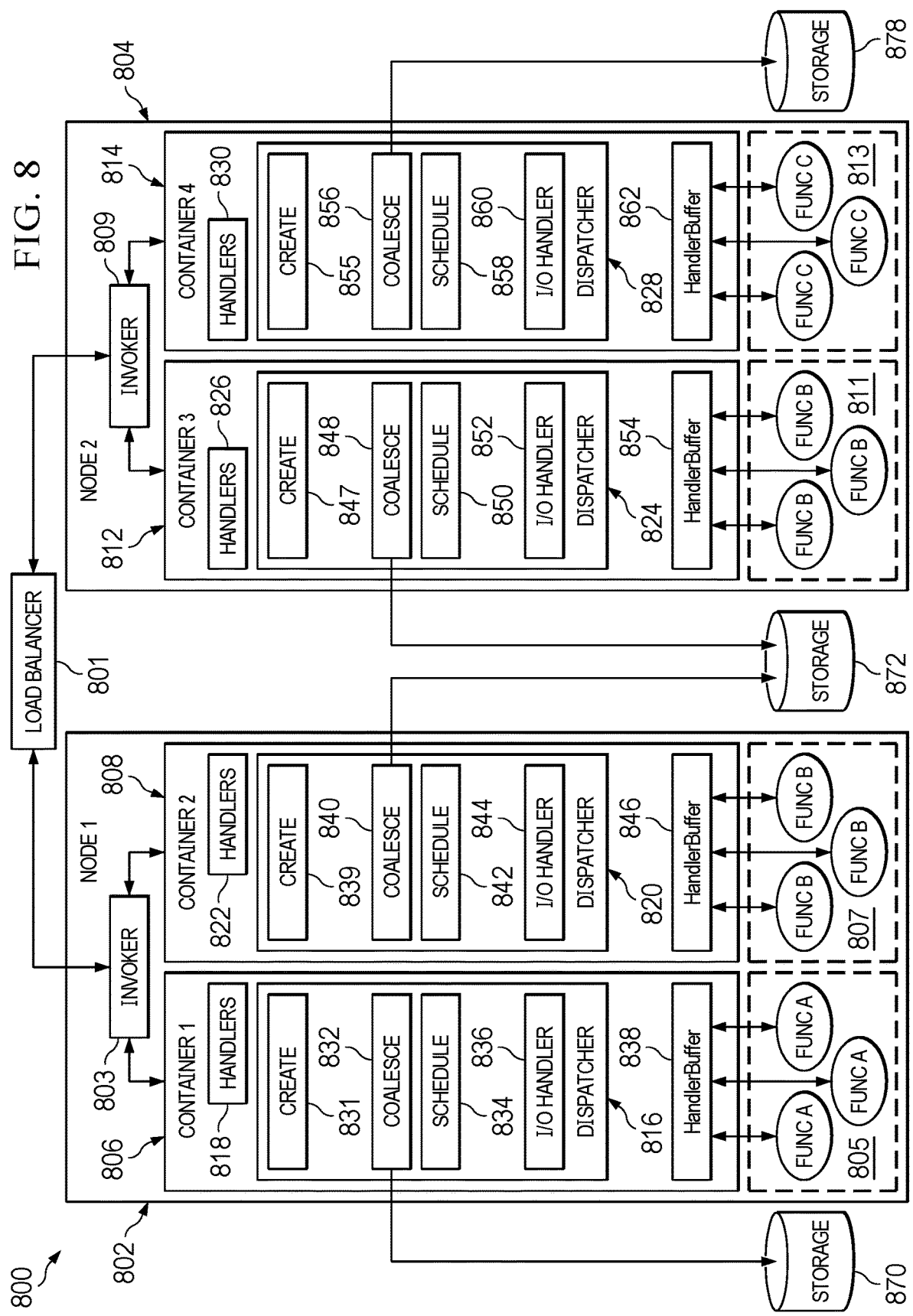
FIG. 8 is diagram of a serverless computing architecture in accordance with an illustrative embodiment.

Turning to FIG. 8, a diagram of a serverless computing architecture is depicted in accordance with an illustrative embodiment. In this example, serverless computing architecture 800 can be implemented using the different components illustrated in FIGS. 2-8.

In this illustrative example, serverless computing architecture 800 comprises node 1 802 and node 2 804. These nodes can be an example of worker nodes 260 in FIG. 2. In this example, load balancer 801 can send requests to node 1 802 and node 2 804. Invoker 803 can invoke container 1 806 to handle requests 805 for function A and container 2 808 to handle requests 807 for function B. Invoker 809 can invoke container 3 812 to handle requests 811 for function B and container 4 814 to handle requests 813 for function C. In this example, container 1 806, container 2 808, container 3 812, and container 4 814 are examples of container 216 and containers 250 in FIGS. 2, 5, and 6.

As depicted, container 1 806 has dispatcher 816 and handlers 818, container 2 808 has dispatcher 820 and handlers 822. Container 3 812 has dispatcher 824 and handlers 826, and container 4 814 has dispatcher 828 and handlers 830.

As depicted in this illustrative example, these dispatchers include components: create, coalesce, schedule, and intercept. The dispatchers use handler buffers to track and schedule handlers.

For example, dispatcher 816 has create 831, coalesce 832, schedule 834, and I/O handler 836 and uses handler buffer 838. As another example, dispatcher 820 has create 839, coalesce 840, schedule 842, and I/O handler 844 and uses handler buffer 846. As depicted, dispatcher 824 has create 847, coalesce 848, schedule 850, and I/O handler 852 and uses handler buffer 854. Dispatcher 828 has create 855, coalesce 856, schedule 858, and I/O handler 860 and uses handler buffer 862.

In this illustrative example, create 831, create 839, create 847, and create 855 can be implemented using create 221 in FIG. 2. In this example, schedule 834, schedule 842, schedule 850, and schedule 858, can be implemented using schedule 501 in FIG. 5. Coalesce 832, coalesce 840, coalesce 848, and coalesce 856 can be implemented using coalesce 609 in FIG. 6. Further in this example, I/O handler 836, I/O handler 844, I/O handler 852, and I/O handler 860 can be implemented using I/O handler 505 in FIG. 5 and FIG. 6.

In this illustrative example, the scheduling components in the dispatchers can be used to schedule the running in suspending of handlers based on available processing resources such as cores. Examples of scheduling are described in FIG. 5. The coalesce functions can be used to manage remote data access made by the handlers to various remote data sources such as storage 870, storage 872, and storage 878. Examples of coalescing remote data access are described in FIG. 6 and FIG. 7.

Figure 9:
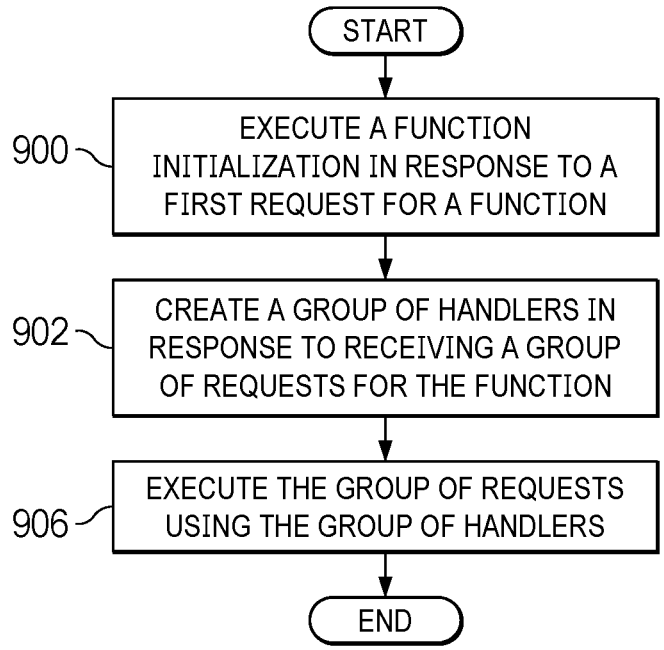
FIG. 9 is a flowchart of a process for managing function execution in a container in accordance with an illustrative embodiment.

Serverless computing architecture 800 is provided as an example of an implementation for serverless computing environment 200 in the different components shown in FIGS. 2-7. This example is not meant to limit the manner in which other illustrative examples can be implemented. For example, one or more nodes may be present in addition to node 1 802 and node 2 804. Further, each node may have other numbers of containers other than the two containers shown in this example. For example, a node can have 1 container, 3 containers, 11 containers, or some other number containers. Further, additional components but not shown can be present in serverless computing architecture 800. For example, tracking data structures can be present for use by the dispatchers although not shown in these examples Turning next to FIG. 9, a flowchart of a process for managing function execution in a container is depicted in accordance with an illustrative embodiment. The process in FIG. 9 can be implemented in hardware, software, or both. When implemented in software, the process can take the form of program instructions that is run by one of more processor units located in one or more hardware devices in one or more computer systems. For example, the process can be implemented in function manager 210 in computer system 208 in FIG. 2.

The process begins by executing a function initialization in response to a first request for a function (step 900). The process creates group of handlers in response to receiving a group of requests for the function (step 902). In step 902, a handler is created for each request such that each handler in the group of handlers handles a request in the group of requests. The process executes the group of requests using the group of handlers (step 904). The process terminates thereafter.

Figure 10:
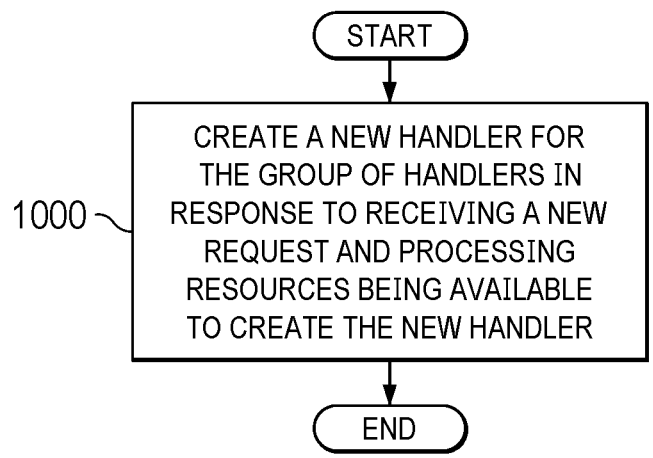
FIG. 10 is a flowchart of a process for creating a new handler for a group of handlers in accordance with an illustrative embodiment.

Turning to FIG. 10, a flowchart of a process for creating a new handler for a group of handlers is depicted in accordance with an illustrative embodiment. The process in FIG. 10 is an example of an additional step that can be performed in the process in FIG. 9.

The process creates a new handler for the group of handlers in response to receiving a new request and processing resources being available to create the new handler (step 1000). The process terminates thereafter.

Figure 11:
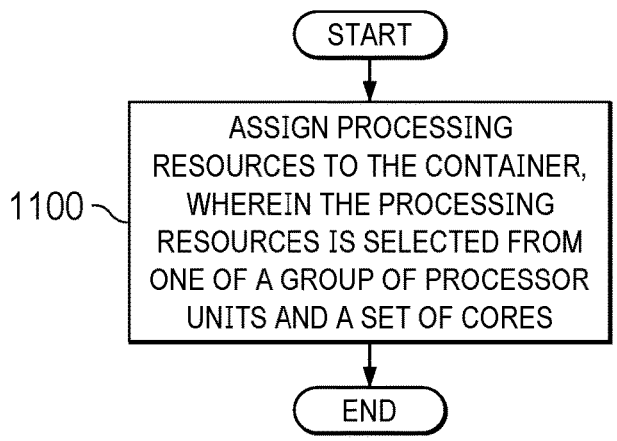
FIG. 11 is a flowchart of a process for assigning processing resources to a container in accordance with an illustrative embodiment.

With reference to FIG. 11, a flowchart of a process for assigning processing resources to a container is depicted in accordance with an illustrative embodiment. The process in FIG. 11 is an example of an additional step that can be performed in the process in FIG. 9. The process assigns processing resources to the container, wherein the processing resources is selected from one of a group of processor units and a set of cores (step 1100). The process terminates thereafter.

Figure 12:
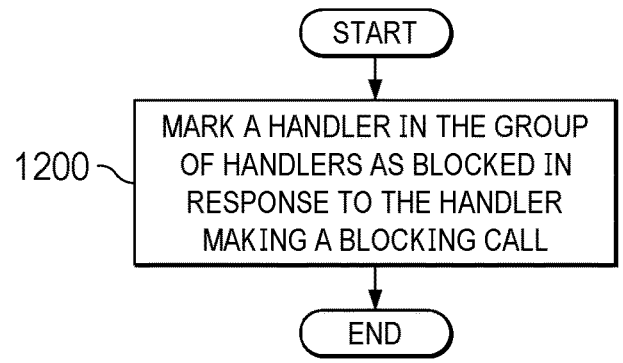
FIG. 12 is a flowchart of a process for marking a handler in a group of handlers as blocked in accordance with an illustrative embodiment.

Turning now to FIG. 12, a flowchart of a process for marking a handler in a group of handlers as blocked is depicted in accordance with an illustrative embodiment. The process in FIG. 12 is an example of an additional step that can be performed in the process in FIG. 9. The process marks a handler in the group of handlers as blocked in response to the handler making a blocking call (step 1200). The process terminates thereafter.

Figure 13:
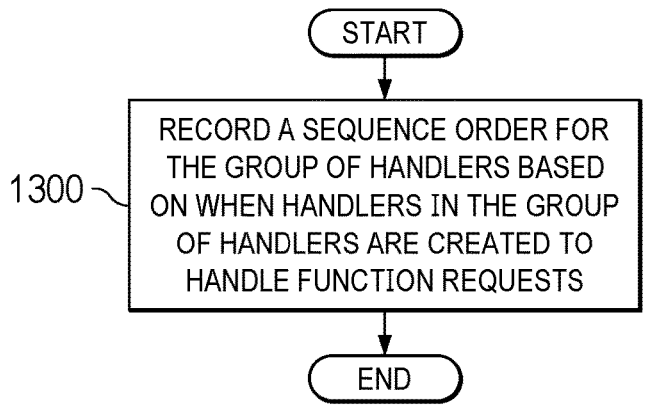
FIG. 13 is a flowchart of a process for recording a sequence order for a group of handlers in accordance with an illustrative embodiment.

Turning next to FIG. 13, a flowchart of a process for recording a sequence order for a group of handlers is depicted in accordance with an illustrative embodiment. The process in FIG. 13 is an example of an additional step that can be performed in the process in FIG. 9. The process records a sequence order for the group of handlers based on when handlers in the group of handlers are created to handle function requests (step 1300). The process terminates thereafter.

Figure 14:
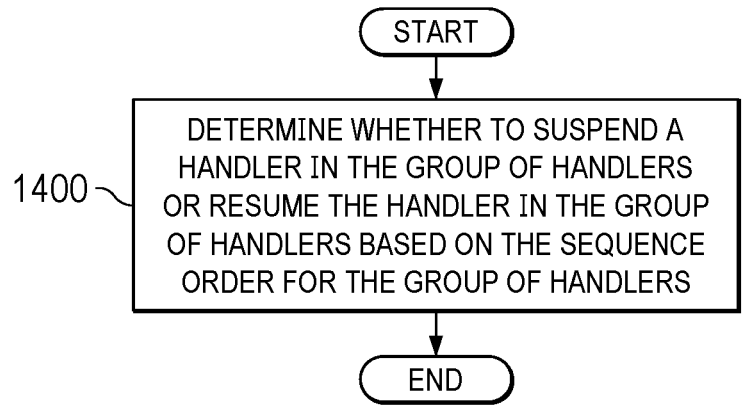
FIG. 14 is a flowchart of a process for determining whether to suspend or resume a handler in a group of handlers in accordance with an illustrative embodiment.

With reference now to FIG. 14, a process for determining whether to suspend or resume a handler in a group of handlers is depicted in accordance with an illustrative embodiment. The process in FIG. 14 is an example of an additional step that can be performed in the process in FIG. 13.

The process determines whether to suspend a handler in the group of handlers or resume the handler in the group of handlers based on the sequence order for the group of handlers (step 1400). The process terminates thereafter.

Figure 15:
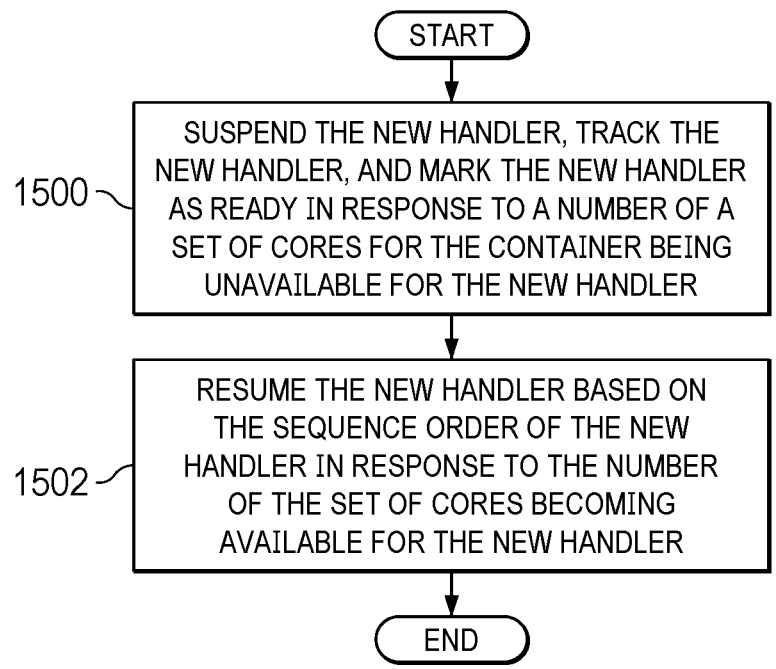
FIG. 15 is a flowchart of a process for suspending, tracking, and marking a handler as ready and resuming the handler in accordance with an illustrative embodiment.

Next in FIG. 15, a flowchart of a process for suspending, and resuming a new handler is depicted in accordance with an illustrative embodiment. The process in FIG. 15 is an example of additional steps that can be performed in the process in FIG. 13.

The process begins by suspending the new handler, tracking the new handler, and marking the new handler as ready in response to a number of a set of cores for the container being unavailable for the new handler (step 1500). The process resumes the new handler based on the sequence order of the handler in response to the number of the set of cores becoming available for the new handler (step 1502). The process terminates thereafter.

Figure 16:
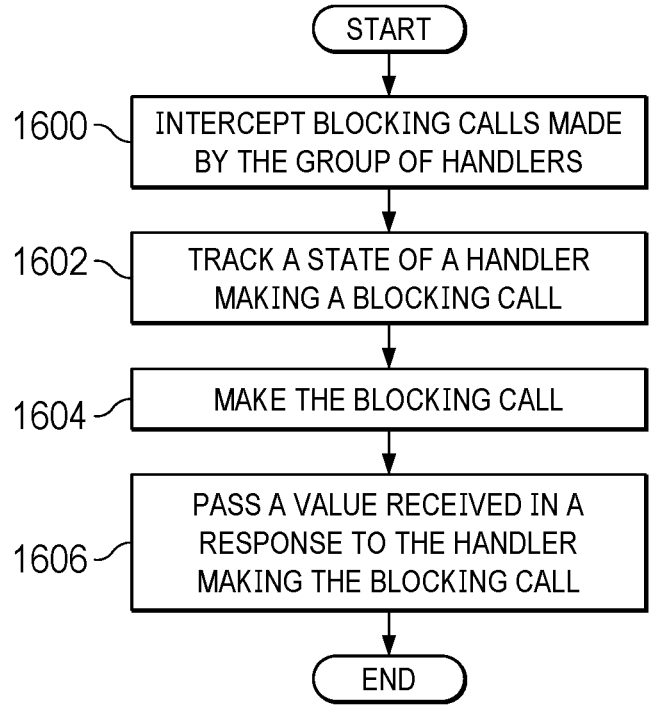
FIG. 16 is a flowchart of a process for processing a blocking call made by a handler in accordance with an illustrative embodiment.

Turning to FIG. 16, a flowchart of a process for processing a blocking call made by a handler is depicted in accordance with an illustrative embodiment. The process in FIG. 16 is an example of additional steps that can be performed in the process in FIG. 9.

The process begins by intercept blocking calls made by the group of handlers (step 1600). The process tracks a state of a handler making a blocking call (step 1602). In step 1602, the state of a handler can be tracked in a data structure such as tracking data structure 602 in FIG. 6. The process makes the blocking call (step 1604). The process passes a value received in a response to the handler making the blocking call (step 1606). The process terminates thereafter.

In this example, I/O blocking handler in the dispatcher receives the blocking call from the handler, makes the blocking call, and handles receiving a response. A schedule in the dispatcher tracks the state of the handler.

Figure 17:
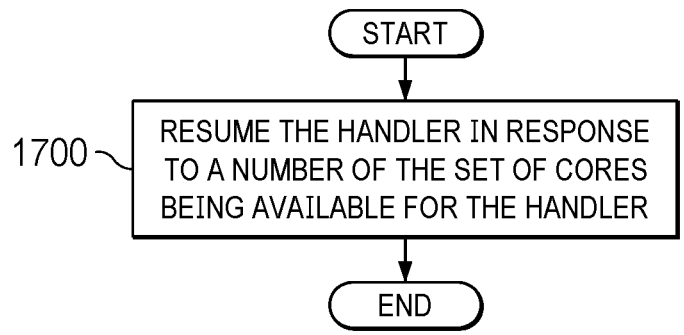
FIG. 17 is a flowchart of a process for resuming a handler in accordance with an illustrative embodiment.

Turning next to FIG. 17, a flowchart of a process for resuming a handler is depicted in accordance with an illustrative embodiment. The process in FIG. 17 is an example of an additional step that can be performed in the process in FIG. 16. The process resumes the handler in response to a number of a set of cores being available for the handler (step 1700). The process terminates thereafter.

Figure 18:
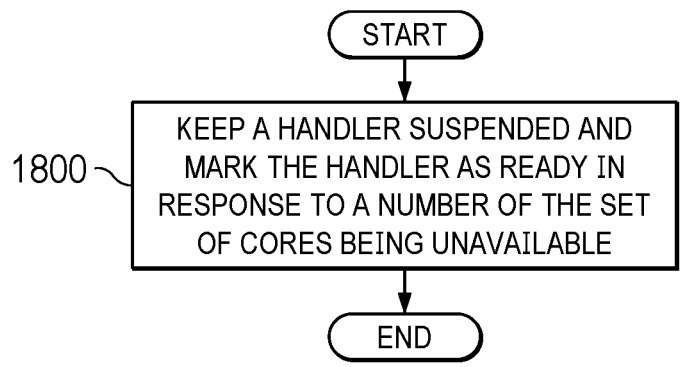
FIG. 18 is a flowchart of a process for keeping a handler suspended and marked as ready in accordance with an illustrative embodiment.

With reference to FIG. 18, a flowchart of a process for keeping the handler suspended and marked as ready is depicted in accordance with an illustrative embodiment. The process in FIG. 18 is an example of an additional step that can be performed in the process in FIG. 16. The process keeps a handler suspended and marking the handler as ready in response to a number of a set of cores being unavailable (step 1800). The process terminates thereafter.

Figure 19:
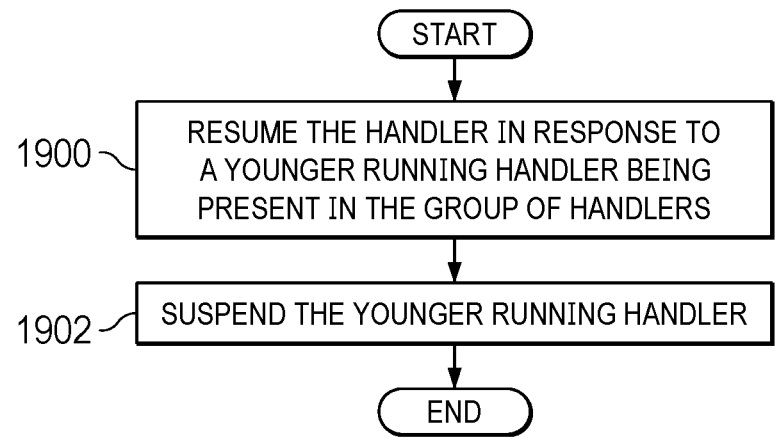
FIG. 19 is a flowchart of a process for resuming a handler in accordance with an illustrative embodiment.

Turning to FIG. 19, a flowchart of a process for resuming a handler is depicted in accordance with an illustrative embodiment. The process in FIG. 19 is an example of additional steps that can be performed in the process in FIG. 16.

The process begins by resuming the handler in response to a younger running handler being present in the group of handlers (step 1900). The process suspends the younger running handler (step 1902). The process terminates thereafter.

Figure 20:
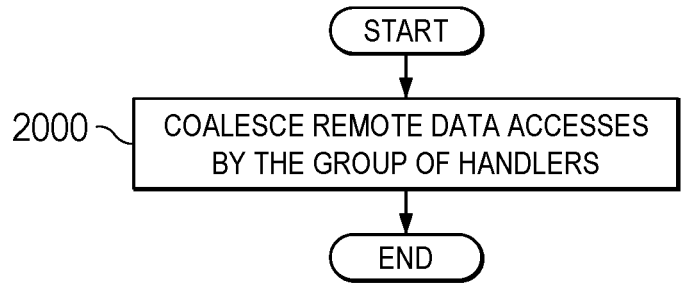
FIG. 20 is a flowchart of a process for coalescing remote data accesses in accordance with an illustrative embodiment.

Turning next to FIG. 20, a flowchart of a process for coalescing remote data accesses is depicted in accordance with an illustrative embodiment. The process in FIG. 20 is an example of an additional step that can be performed in the process in FIG. 9. The process coalesces remote data accesses by the group of handlers (step 2000). The process terminates thereafter.

Figure 21:
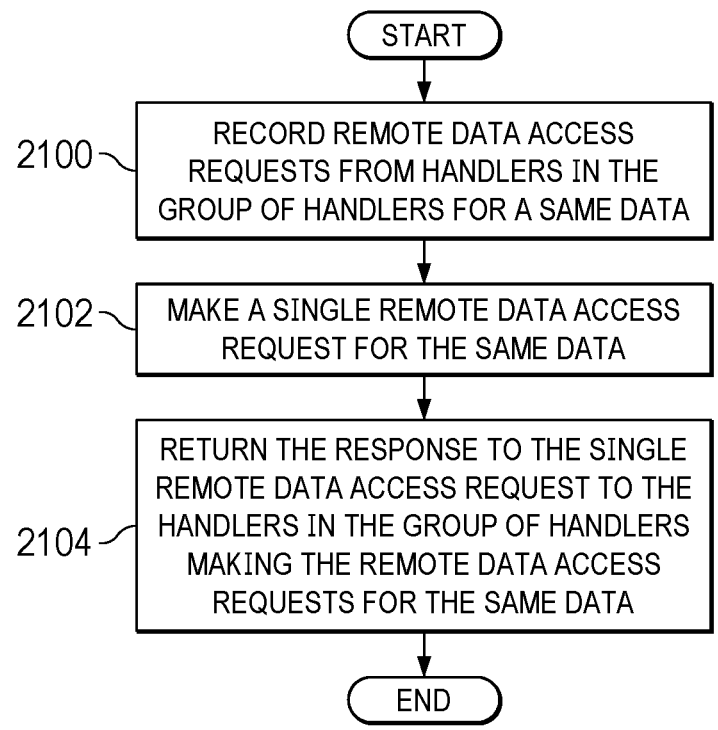
FIG. 21 is a flowchart of a process for coalescing remote data accesses by a group of handlers in accordance with an illustrative embodiment.

With reference to FIG. 21, a flowchart of a process for coalescing remote data accesses by a group of handlers is depicted in accordance with an illustrative embodiment. The process in FIG. 21 is an example of an implementation for step 2000 in FIG. 20.

The process begins by recording remote data access requests from handlers in the group of handlers for a same data (step 2100). The requests for the same data can be recorded in a data structure such as tracking data structure 602 in FIG. 6.

The process makes a single remote data access request for the same data (step 2102). The process returns the response to the single remote data access request to the handlers in the group of handlers making the remote data access requests for the same data (step 2104). The process terminates thereafter.

Figure 22:
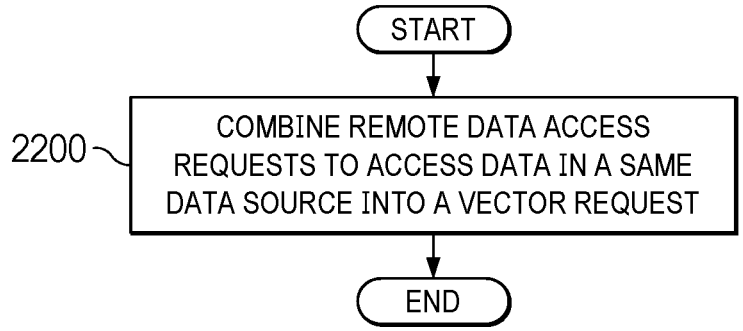
FIG. 22 is a flowchart of a process for coalescing remote data accesses by a group of handlers in accordance with an illustrative embodiment.

Turning to FIG. 22, a flowchart of a process for coalescing remote data accesses by a group of handlers is depicted in accordance with an illustrative embodiment. The process in FIG. 22 is an example of an implementation for step 2000 in FIG. 20. The process combines remote data access requests to access data in a same data source into a vector request (step 2200). The process terminates thereafter.

Figure 23:
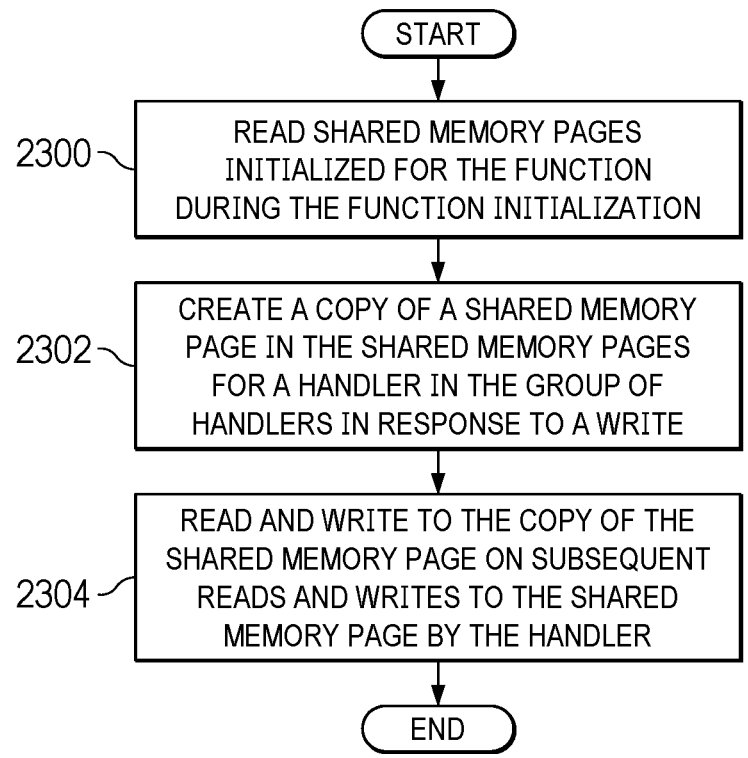
FIG. 23 is a flowchart of a process for reading accessing memory pages in accordance with an illustrative embodiment.

Turning next to FIG. 23, a flowchart of a process for accessing memory pages is depicted in accordance with an illustrative embodiment. The process in FIG. 23 is an example of additional steps that can be performed in the process in FIG. 9.

The process begins by reading shared memory pages initialized for the function during the function initialization (step 2300). The process creates a copy of a shared memory page in the shared memory pages for a handler in the group of handlers in response to a write (step 2302). The process reads and writes to the copy of the shared memory page on subsequent reads and writes to the shared memory page by the handler (step 2304). The process terminates thereafter.

Figure 24:
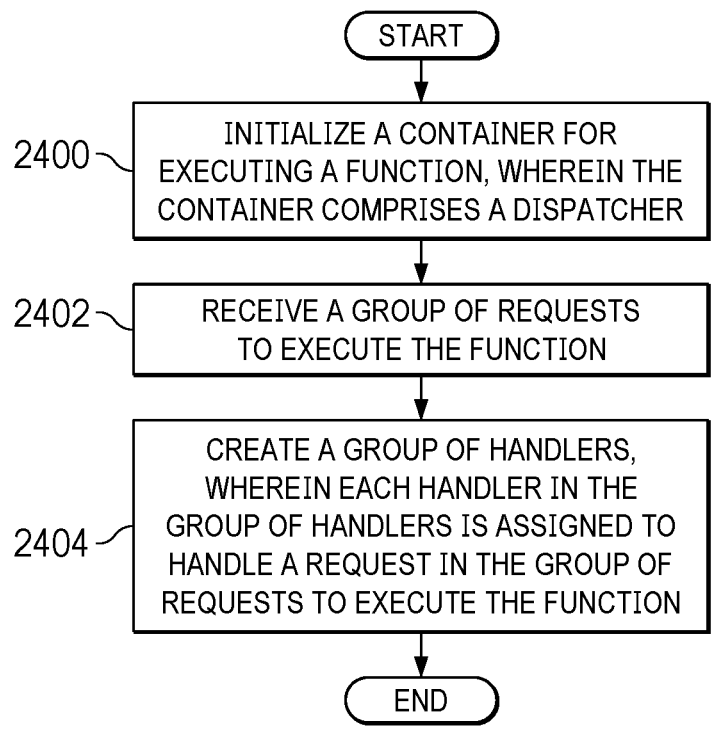
FIG. 24 is a flowchart of a process for managing function execution in containers in accordance with an illustrative embodiment.

With reference to FIG. 24, a flowchart of a process for managing function execution in containers is depicted in accordance with an illustrative embodiment. The process in FIG. 24 can be implemented in hardware, software, or both. When implemented in software, the process can take the form of program instructions that is run by one or more processor units located in one or more hardware devices in one or more computer systems. For example, the process can be implemented in function manager 210 in computer system 208 in FIG. 2.

The process begins by initializing a container for executing a function, wherein the container comprises a dispatcher (step 2400). The process receives a group of requests to execute the function (step 2402). The process creates a group of handlers, wherein each handler in the group of handlers is assigned to handle a request in the group of requests to execute the function (step 2404). The process terminates thereafter.

Figure 25:
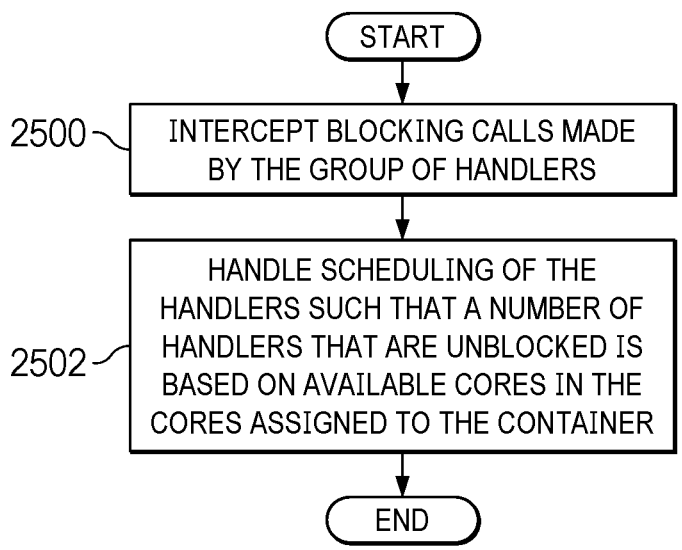
FIG. 25 is a flowchart of a process for handling scheduling of handlers in accordance with an illustrative embodiment.

Turning to FIG. 25, a flowchart of a process for handling scheduling of handlers is depicted in accordance with an illustrative embodiment. The process in FIG. 25 is an example of additional steps that can be performed in the process in FIG. 24.

The process begins by intercepting blocking calls made by the group of handlers (step 2500). In step 2500, the intercepting of the blocking calls made by the group of handlers can be made using a library call in a library for the group of handlers that causes the blocking calls made by the group of handlers to be redirected to the dispatcher. The process handles scheduling of the handlers such that a number of handlers that are unblocked is based on available cores in the cores assigned to the container (step 2502). The process terminates thereafter.

Figure 26:
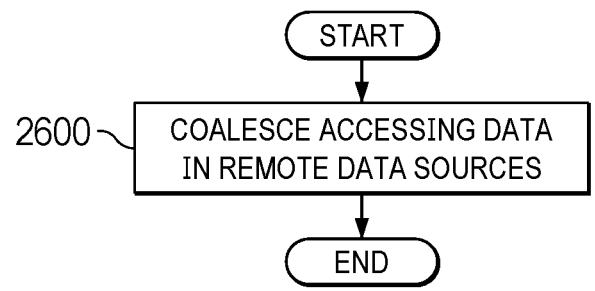
FIG. 26 is a flowchart of a process for coalescing accessing data in remote data sources in accordance with an illustrative embodiment.

Turning next to FIG. 26, a flowchart of a process for coalescing accessing data in remote data sources is depicted in accordance with an illustrative embodiment. The process in FIG. 26 is an example of an additional step that can be performed in the process in FIG. 24. The process coalesces accessing data in remote data sources (step 2600). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 27:
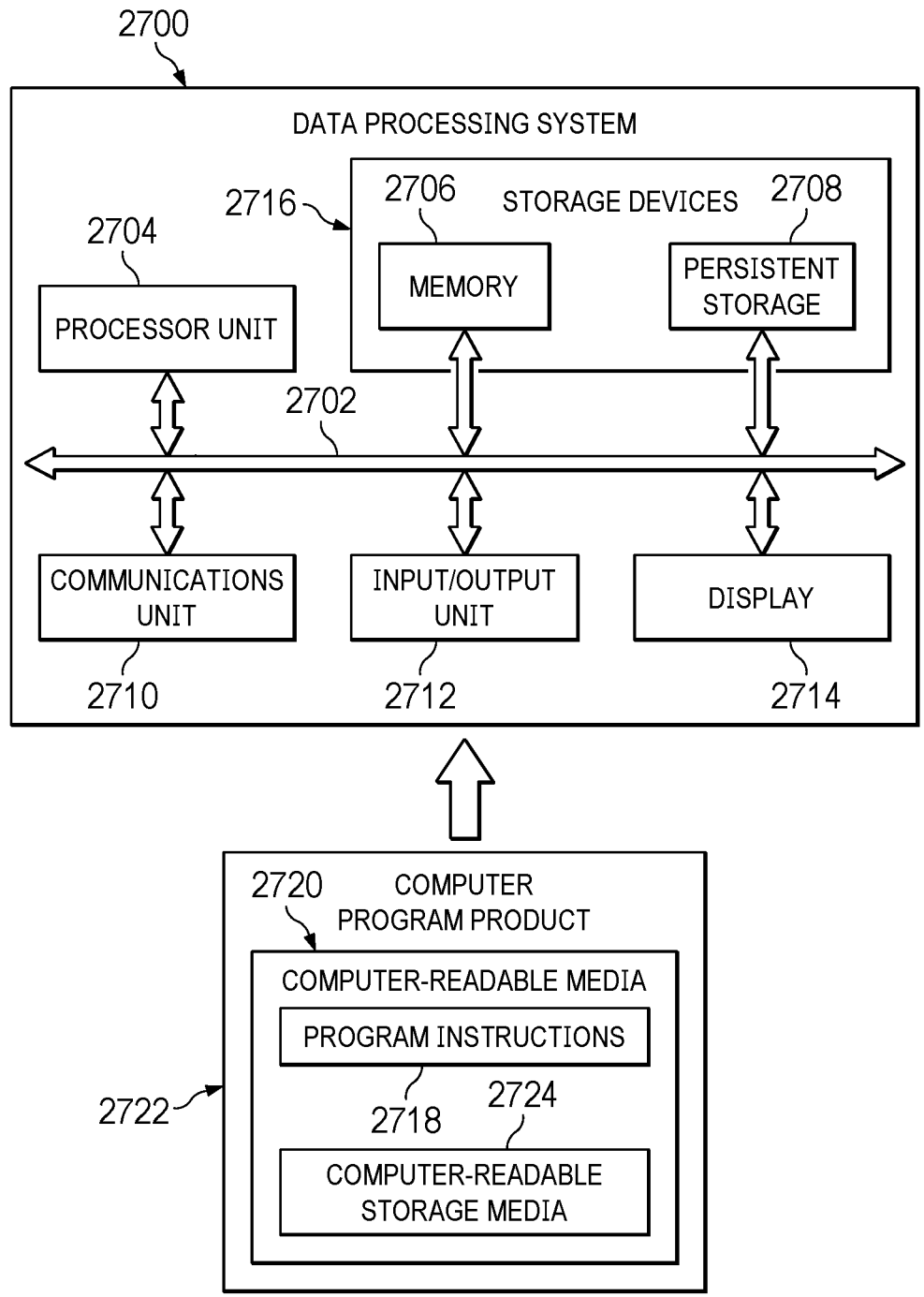
FIG. 27 is a block diagram of a data processing system in accordance with an illustrative embodiment.

Turning now to FIG. 27, a block diagram of a data processing system is depicted in accordance with an illustrative embodiment. Data processing system 2700 can be used to implement computers and computing devices in computing environment 100 in FIG. 1. Data processing system 2700 can also be used to implement computer system 208 in FIG. 2. In this illustrative example, data processing system 2700 includes communications framework 2702, which provides communications between processor unit 2704, memory 2706, persistent storage 2708, communications unit 2710, input/output (I/O) unit 2712, and display 2714. In this example, communications framework 2702 takes the form of a bus system.

Processor unit 2704 serves to execute instructions for software that can be loaded into memory 2706. Processor unit 2704 includes one or more processors. For example, processor unit 2704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2704 can may be implemented using one or more heterogeneous processor systems in which a main processor is present with secondary processors on a single chip. As another illustrative example, processor unit 2704 can be a symmetric multi-processor system containing multiple processors of the same type on a single chip.

Memory 2706 and persistent storage 2708 are examples of storage devices 2716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2716 may also be referred to as computer readable storage devices in these illustrative examples. Memory 2706, in these examples, can be, for example, a random-access memory or any other suitable volatile or non-volatile storage device. Persistent storage 2708 may take various forms, depending on the particular implementation.

For example, persistent storage 2708 may contain one or more components or devices. For example, persistent storage 2708 can be a hard drive, a solid-state drive (SSD), a flash memory, a rewritable optical disk, a rewritable magnetic tape, or some combination of the above. The media used by persistent storage 2708 also can be removable. For example, a removable hard drive can be used for persistent storage 2708.

Communications unit 2710, in these illustrative examples, provides for communications with other data processing systems or devices. In these illustrative examples, communications unit 2710 is a network interface card.

Input/output unit 2712 allows for input and output of data with other devices that can be connected to data processing system 2700. For example, input/output unit 2712 may provide a connection for user input through at least one of a keyboard, a mouse, or some other suitable input device. Further, input/output unit 2712 may send output to a printer. Display 2714 provides a mechanism to display information to a user.

Instructions for at least one of the operating system, applications, or programs can be located in storage devices 2716, which are in communication with processor unit 2704 through communications framework 2702. The processes of the different embodiments can be performed by processor unit 2704 using computer-implemented instructions, which may be located in a memory, such as memory 2706.

These instructions are referred to as program instructions, computer usable program instructions, or computer readable program instructions that can be read and executed by a processor in processor unit 2704. The program instructions in the different embodiments can be embodied on different physical or computer readable storage media, such as memory 2706 or persistent storage 2708.

Program instructions 2718 is located in a functional form on computer readable media 2720 that is selectively removable and can be loaded onto or transferred to data processing system 2700 for execution by processor unit 2704. Program instructions 2718 and computer readable media 2720 form computer program product 2722 in these illustrative examples. In the illustrative example, computer readable media 2720 is computer readable storage media 2724.

Computer readable storage media 2724 is a physical or tangible storage device used to store program instructions 2718 rather than a medium that propagates or transmits program instructions 2718. Computer readable storage media 2724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 2718 can be transferred to data processing system 2700 using a computer readable signal media. The computer readable signal media are signals and can be, for example, a propagated data signal containing program instructions 2718. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 2720" can be singular or plural. For example, program instructions 2718 can be located in computer readable media 2720 in the form of a single storage device or system. In another example, program instructions 2718 can be located in computer readable media 2720 that is distributed in multiple data processing systems. In other words, some instructions in program instructions 2718 can be located in one data processing system while other instructions in program instructions 2718 can be located in one data processing system. For example, a portion of program instructions 2718 can be located in computer readable media 2720 in a server computer while another portion of program instructions 2718 can be located in computer readable media 2720 located in a set of client computers.

The different components illustrated for data processing system 2700 are not meant to provide architectural limitations to the manner in which different embodiments can be implemented. In some illustrative examples, one or more of the components may be incorporated in or otherwise form a portion of, another component. For example, memory 2706, or portions thereof, may be incorporated in processor unit 2704 in some illustrative examples. The different illustrative embodiments can be implemented in a data processing system including components in addition to or in place of those illustrated for data processing system 2700. Other components shown in FIG. 27 can be varied from the illustrative examples shown. The different embodiments can be implemented using any hardware device or system capable of running program instructions 2718.

Thus, illustrative embodiments provide a computer implemented method, computer system, and computer program product for managing function execution in a container in a serverless computing environment. In one illustrative example, a computer implemented method manages function execution in a container. A dispatcher in the container running in a computer system executes a function initialization in response to a first request for a function. The dispatcher in the container running in the computer system creates group of handlers in response to receiving a group of requests for the function. The dispatcher in the container running in the computer system sends the group of requests to the group of handlers in response to receiving the group of requests. The dispatcher in the container running in the computer system executes the group of requests using the group of handlers.

In these illustrative examples, in addition to forking or creating handlers in a container to execute requests for the same function, a dispatcher can schedule the running of handlers in a manner that reduces inefficiencies in the use of processor resources. For example, handlers making blocking calls can be suspended and the cores assigned to those handlers can be provided to other handlers to handle requests to execute a function. The scheduling of the handlers can be performed based on the availability of cores as handlers become ready to run or created to execute requests for functions.

Further, dispatchers can coalesce remote data access requests made by handlers. This coalescing can be performed in a manner that reduces the number of remote data access requests sent to remote data sources. As result, the number of requests processed by remote data source can be reduced. Further, the amount of bandwidth used also can be reduced increasing the availability of bandwidth for other uses.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing function execution in a container, the computer implemented method comprising:
    executing, by a dispatcher in the container running in a computer system, a function initialization in response to a first request for a function;
    creating, by the dispatcher in the container running in the computer system, a group of handlers in response to receiving a group of requests for the function, wherein the group of handlers is at least two handlers; and
    executing, by the dispatcher in the container running in the computer system, the group of requests using the group of handlers.

2. The computer implemented method of claim 1 further comprising:
    creating, by the dispatcher in the container running in the computer system, a new handler for the group of handlers in response to receiving a new request and processing resources being available to create the new handler.

3. The computer implemented method of claim 1 further comprising:
    assigning, by the dispatcher in the container running in the computer system, processing resources to the container, wherein the processing resources is selected from one of a group of processor units and a group of cores.

4. The computer implemented method of claim 1 further comprising:
    marking, by the dispatcher in the container running in the computer system, a handler in the group of handlers as blocked in response to the handler making a blocking call.

5. The computer implemented method of claim 1 further comprising:
    recording, by the dispatcher in the container running in the computer system, a sequence order for the group of handlers based on when handlers in the group of handlers are created to handle requests.

6. The computer implemented method of claim 5 further comprising:
    determining, by the dispatcher in the container running in the computer system, whether to suspend a handler in the group of handlers or resume the handler in the group of handlers based on the sequence order for the group of handlers.

7. The computer implemented method of claim 5 further comprising:
    suspending, by the dispatcher in the container running in the computer system, a new handler, tracking the new handler, and marking the new handler as ready in response to a number of a set of cores for the container being unavailable for the new handler; and
    resuming, by the dispatcher in the container running in the computer system, the new handler based on the sequence order of the handler in response to the number of the set of cores becoming available for the new handler.

8. The computer implemented method of claim 1 further comprising:
    intercepting, by the dispatcher in the container running in the computer system, blocking calls made by the group of handlers;
    tracking, by the dispatcher in the container running in the computer system, a state of a handler making a blocking call;
    making, by the dispatcher in the container running in the computer system, the blocking call; and
    passing, by the dispatcher in the container running in the computer system, a value received in a response to the handler making the blocking call.

9. The computer implemented method of claim 8 further comprising:
    resuming, by the dispatcher in the container running in the computer system, the handler in response to a number of a set of cores being available for the handler.

10. The computer implemented method of claim 8 further comprising:
    keeping, by the dispatcher in the container running in the computer system, the handler suspended and marking the handler as ready in response to a number of a set of cores being unavailable.

11. The computer implemented method of claim 8 further comprising:
    resuming, by the dispatcher in the container running in the computer system, the handler in response to a younger running handler being present in the group of handlers; and
    suspending, by the dispatcher in the container running in the computer system, the younger running handler.

12. The computer implemented method of claim 1 further comprising:
    coalescing, by the dispatcher in the container running in the computer system, remote data accesses by the group of handlers.

13. The computer implemented method of claim 12, wherein coalescing, by the dispatcher in the container running in the computer system, remote storage accesses by the group of handlers comprises:
    recording, by the dispatcher in the container running in the computer system, remote data access requests from handlers in the group of handlers for a same data;
    making, by the dispatcher in the container running in the computer system, a single remote data access request for the same data; and
    returning, by the dispatcher in the container running in the computer system, the response to the single remote data access request to the handlers in the group of handlers making the remote data access requests for the same data.

14. The computer implemented method of claim 12, wherein coalescing remote storage accesses by the group of handlers comprises:

combining, by the dispatcher in the container running in the computer system, remote data access requests to access data in a same data source into a vector request.

15. The computer implemented method of claim 1 further comprising:
reading, by the group of handlers in the container running in the computer system, shared memory pages initialized for the function during the function initialization;
creating, by a handler in the group of handlers in the container running in the computer system, a copy of a shared memory page in the shared memory pages for a handler in the group of handlers in response to a write; and
reading and writing, by the handler in the group of handlers in the container running in the computer system, to the copy of the shared memory page on subsequent reads and writes to the shared memory page by the handler.

16. The computer implemented method of claim 1, wherein the group of handlers use a shared file used to execute the function, wherein a temporary file is created for a handler in the group of handlers for writes to the shared file, and wherein the temporary file is used by the handler for subsequent reads and writes in place of the shared file.

17. A computer system comprising:
a set of processor units, wherein the set of processor units executes program instructions to:
execute, a dispatcher in a container running in a computer system, a function initialization in response to a first request for a function;
create, by the dispatcher in the container running in the computer system, group of handlers in response to receiving a group of requests for the function, wherein the group of handlers is at least two handlers; and
execute, by the dispatcher in the container running in the computer system, the group of requests using the group of handlers.

18. The computer system of claim 17, wherein the set of processor units executes the program instructions to:
create a new handler for the group of handlers in response to receiving a new request, none of the group of handlers being available to handle the new request, and processing resources being available to create the new handler.

19. The computer system of claim 17, wherein the set of processor units executes the program instructions to:
assign processing resources to the container, wherein the processing resources is selected from one of a group of processor units and a group of cores.

20. The computer system of claim 17, wherein the set of processor units executes the program instructions to:
mark a handler in the group of handlers as blocked in response to the handler making a blocking call.

21. The computer system of claim 17, wherein the set of processor units executes the program instructions to:
record a sequence order for the group of handlers based on when handlers in the group of handlers are created to handle requests.

22. The computer system of claim 21, wherein the set of processor units executes the program instructions to:
determine whether to suspend a handler in the group of handlers or resume the handler in the group of handlers based on the sequence order for the group of handlers.

23. The computer system of claim 21, wherein the set of processor units executes the program instructions to:
suspend a handler, tracking the handler, and marking the handler as ready in response to a number of a set of cores for the container being unavailable for the handler; and
resume the handler based on the sequence order of the handler in response to the number of the set of cores become available for the handler.

24. The computer system of claim 17, wherein the set of processor units executes the program instructions to:
coalesce remote data accesses by the group of handlers.

25. A computer program product for managing function execution in a container, the computer program product comprising a computer-readable storage medium having program instructions embodied therewith, the program instructions executable by a computer system to cause the computer system to perform a method of:
executing, a dispatcher in the container running in a computer system, a function initialization in response to a first request for a function;
creating, by the dispatcher in the container running in the computer system, group of handlers in response to receiving a group of requests for the function, wherein the group of handlers is at least two handlers; and
executing, by the dispatcher in the container running in the computer system, the group of requests using the group of handlers.

* * * * *